(12) United States Patent
Fenney

(10) Patent No.: US 12,488,506 B2
(45) Date of Patent: Dec. 2, 2025

(54) COMPRESSION AND DECOMPRESSION OF SUB-PRIMITIVE PRESENCE INDICATIONS FOR USE IN A RENDERING SYSTEM

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 186 days.

(21) Appl. No.: 18/203,270

(22) Filed: May 30, 2023

(65) Prior Publication Data

US 2024/0029310 A1 Jan. 25, 2024

(30) Foreign Application Priority Data

May 30, 2022 (GB) ...................................... 2207936
May 30, 2022 (GB) ...................................... 2207939

(51) Int. Cl.
*G06T 9/00* (2006.01)
*G06T 15/06* (2011.01)

(52) U.S. Cl.
CPC ................ *G06T 9/00* (2013.01); *G06T 15/06* (2013.01); *G06T 2210/21* (2013.01)

(58) Field of Classification Search
CPC ........... G06T 9/00; G06T 9/004; G06T 15/10; G06T 15/06; G06T 15/20; G06T 15/40;
(Continued)

(56) References Cited

U.S. PATENT DOCUMENTS 5,661,822 A 8/1997 Knowles et al.
8,107,753 B2 1/2012 Rasmusson et al.
(Continued)

FOREIGN PATENT DOCUMENTS

JP 5732125 B2 6/2015

OTHER PUBLICATIONS

Holger et al; "Sub-triangle opacity masks for faster ray tracing of transparent objects"; Proc. ACM Comput. Graph. Interact. Tech.,; vol. 3, No. 2, Aug. 26, 2020; 12 pages.
(Continued)

*Primary Examiner* — Hau H Nguyen
(74) *Attorney, Agent, or Firm* — Potomac Law Group, PLLC; Vincent M DeLuca

(57) ABSTRACT

Compressed data is decompressed to determine sub-primitive presence indications for intersection testing in a rendering system. Entropy encoded data is read from a block of compressed sub-primitive presence indications data and entropy decoding determines a block of entropy decoded data values. Spatial recorrelation on the block of entropy decoded values determines sub-primitive presence indications. For each line of entropy decoded values in a first dimension: for the entropy decoded values in the line: (i) a predicted value is determined for the entropy decoded value based on other entropy decoded values in the line, and (ii) the entropy decoded value is replaced with a value of a sum of the entropy decoded value and the determined predicted value for the entropy decoded value. For each line of entropy decoded values in a second dimension: for the entropy decoded values in the line: (i) a predicted value for the entropy decoded value is determined based on other entropy decoded values in the line, and (ii) the entropy decoded value is replaced with a value of a sum of the entropy decoded value and the determined predicted value for the entropy decoded value.

20 Claims, 12 Drawing Sheets

(58) Field of Classification Search
CPC ... G06T 2210/21; H04N 19/91; H04N 19/159
See application file for complete search history.

(56) References Cited

U.S. PATENT DOCUMENTS

| | | | |
|---|---|---|---|
| 8,731,066 B2 | 5/2014 | Sprljan et al. | |
| 8,750,383 B2 | 6/2014 | Milstein | |
| 9,477,676 B2 | 10/2016 | Okuyama | |
| 11,164,359 B2 | 11/2021 | Gruen | |
| 2015/0221127 A1 | 8/2015 | Howson | |
| 2016/0063737 A1* | 3/2016 | Mammou | G06T 9/001 345/423 |
| 2016/0086353 A1* | 3/2016 | Lukac | G06T 9/00 345/419 |
| 2016/0247249 A1 | 8/2016 | Harris et al. | |
| 2021/0201559 A1 | 7/2021 | Gruen | |
| 2022/0217400 A1* | 7/2022 | Schwarz | H04N 19/597 |
| 2022/0232206 A1* | 7/2022 | Lee | H04N 19/593 |

OTHER PUBLICATIONS

Gallaher, Adam: "Generating value for variable if equal to condition", In Stata Forum [online]. Feb. 10, 2021 [retrieved on Mar. 24, 2025 ] . Retrieved from Internet:< URL: https://www.statalist.org/forums/forum/general-stata-discussion/general/1593867-generating-value-for-variable-if-equal-to-condition> (Year: 2021).

Inge, Aniket: "How do I do bitwise AND of two numbers?", In Stack Overflow Forum [online] Feb. 27, 2013, 12:58 PM [retrieved on Mar. 24, 2025 ] . Retrieved from the Internet: (Year: 2013).

Sander: "Grouping elements of a matrix in groups, given that they satisfy certain conditions", In Stack Overflow Forum [online]. May 15, 2017, 11 : 15 [retrieved on Mar. 24, 2025]. Retrieved from the Internet: (Year: 2017).

Torok, Peter: "How to extract a 2x2 submatrix from a bigger matrix", In Stack Overflow Forum [online]. May 9, 2010, 14:36 [retrieved on Mar. 24, 2025]. Retrieved from the Internet: (Year: 2010).

Salomon et al; "Image Compression"; Handbook of Data Compression; Sep. 18, 2009; pp. 443-730.

* cited by examiner

COMPRESSION AND DECOMPRESSION OF SUB-PRIMITIVE PRESENCE INDICATIONS FOR USE IN A RENDERING SYSTEM

CROSS-REFERENCE TO RELATED APPLICATIONS AND CLAIM OF PRIORITY

This application claims foreign priority under 35 U.S.C. 119 from United Kingdom patent application Nos. 2207939.6 and 2207936.2 filed on 30 May 2022, which are incorporated by reference herein in their entirety.

FIELD

The present disclosure is directed to techniques of compressing and/or decompressing sub-primitive presence indications for use in a rendering system such as a ray tracing system.

BACKGROUND

Rendering systems can be used to generate an image of a scene. Two common rendering techniques are ray tracing and rasterization. In particular, ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. Leaf nodes of the acceleration structure represent regions bounding at least one primitive, or part of a primitive, in the scene, and have pointers to the bounded primitives.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The objects may be represented using "primitives". A primitive denotes a unit of geometry in the system, and may for example be a convex polygon. Often the primitives are triangles, but they may be other shapes, e.g. rectangles (the term "rectangle" is used herein to include "square"), pentagons, hexagons, or non-planar shapes such as spheres or bicubic surface patches, or with curved edges, etc.

Primitives are usually simple geometric shapes to facilitate intersection testing to determine whether a ray intersects a primitive. However, primitives can be used to represent more complex shapes. For example, a texture, e.g. a 2D image or a 3D volume, can be applied to a primitive, wherein the texture may have an alpha value which determines the opacity at different positions on the primitive, e.g. a maximum sampled alpha value (e.g. a value of 255 for 8-bit alpha values) means that the primitive is fully opaque at a sample position and a minimum sampled alpha value (e.g. a value of 0) means that the primitive is fully transparent at the sample position. Values in between the minimum and maximum alpha values can represent partial opacity. For the purposes of intersection testing in a ray tracing system, if a ray intersects a primitive at a position where the primitive is fully transparent (i.e. at a position where the alpha value is zero) then the intersection is not accepted, i.e. the ray passes straight through the primitive. In this way, setting the alpha value to zero can be used to represent holes in the primitive, i.e. positions on the primitive that are 'absent' so far as the intersection testing process is concerned. For intermediate alpha values, the system may opt to perform a weighted sum of the objects behind the primitive and of the shaded surface itself or, perhaps, to use a threshold value, often referred to in the art as an alpha test. Textures which include absent regions may be referred to as "punch through textures", "alpha tested textures" or "masked textures", and primitives to which these textures are applied may be referred to as "punch through primitives", "alpha tested transparent primitives" or "masked primitives". Punch through primitives are useful for representing geometry which has a complicated perimeter or lots of holes in it, such as foliage and chain link fences, with a small number of primitives.

Note that a 'texture' may not necessarily be an actual image—it may be computed 'on the fly'. Such computation may be done by executing a 'shader' program. 'Checking a texture' may thus also be understood to include these computational approaches.

FIG. 1 shows an example of two triangular primitives $102_1$ and $102_2$ which share an edge to form a quad. A texture representing a leaf is applied to the two primitives. The texture has some regions (e.g. 104) which are fully transparent, such that they are absent for the purposes of intersection testing. The texture also has some regions (e.g. 106) which are not transparent (e.g. they are opaque), such that they are present for the purposes of intersection testing. Finally, there may be a small number of regions (e.g., along the boundary between regions 104 and 106) which are partially transparent which may be handled with, for example, the two approaches mentioned previously for 'intermediate alpha' values. Different ray tracing systems may react differently to finding an intersection of a ray with a partially transparent region, e.g. the intersection may be treated as a hit, a miss or as a partial hit. One or more additional rays may be spawned as a result of a partial hit.

When an intersection testing process finds that a ray intersects a punch through primitive then the intersection testing process for the ray may be stalled while a shader program is executed on a programmable execution unit to determine whether the primitive is present at the intersection point where the ray intersects the primitive. The presence of the primitive at the intersection point is often determined by the alpha channel of a texture that is mapped onto the primitive. Passing between the intersection testing process (which may be implemented in fixed function hardware) and a shader program (which is executed on a programmable execution unit) introduces latency into the ray tracing system. For example, fixed function hardware implementing the intersection testing process may stall for thousands of clock cycles while the shader program is executed on a programmable execution unit to determine the presence of the primitive at an intersection point. So reducing the number of times that a shader program needs to be executed to determine the presence of a punch through primitive at an intersection point would significantly improve the performance of the ray tracing system. It would be particularly beneficial to reduce the number of times that a shader program needs to be executed to determine the presence of a punch through primitive at an intersection point without increasing the number of primitives used to represent the geometry because increasing the number of primitives would increase the processing costs in the ray tracing system, e.g. the processing costs of rendering, simulation and updates to the acceleration structure.

A paper called "Sub-triangle opacity masks for faster ray tracing of transparent objects" by Holger Gruen, Carsten Benthin and Sven Woop (Proceedings of the ACM on Computer Graphics and Interactive Techniques, Volume 3, Issue 2, Article No.: 18) proposes using sub-triangle opacity masks for ray tracing of alpha tested transparent primitives. Each triangular primitive is subdivided into a set of uniformly sized sub-primitives. For example, FIG. 2 shows a triangular primitive 202 that is subdivided into 64 uniformly sized sub-primitives, labelled 0 to 63. Barycentric coordinates are labelled for the three vertices of the triangular primitive 202 as b=0,0,1, b=0,1,0 and b=1,0,0. Any position within the triangular primitive 202 can be uniquely identified with barycentric coordinates, to thereby indicate which of the sub-primitives (0 to 63) the position is within. For each sub-primitive (0 to 63) an evaluation is made in a pre-processing step to determine sub-primitive presence indications which indicate whether each of the sub-primitives is: (i) fully present, (ii) fully absent, or (iii) partially present. If a sub-primitive is partially present then the texture would need to be checked, e.g. by executing a shader program, to determine whether a particular point within the sub-primitive is present or absent. This pre-processing step may be performed by an Application Programming Interface (API) or as part of the process of creating the primitives and textures, e.g. by a user. Each of the sub-primitive presence indications is represented with 2 bits to indicate one of the three presence states: (i) fully present, (ii) fully absent, or (iii) partially present. A "partially present" state may be referred to as a "check texture" state because the presence at a position within a sub-primitive which is partially present is determined by checking the texture, i.e. by executing a shader program.

When an intersection is found between a ray and a primitive, the presence indications can be queried in order to determine whether to accept the intersection. The position of an intersection within a primitive, e.g. as indicated with barycentric coordinates, is used to identify the sub-primitive that the intersection point is within. If the presence indication for the identified sub-primitive indicates that the sub-primitive is fully present or fully absent then the intersection testing process can continue with the intersection testing without needing to execute a shader program to determine the presence of the primitive at the intersection point. However, if the presence indication for the identified sub-primitive indicates that the sub-primitive is partially present then the texture is checked, by executing a shader program, to determine the presence of the primitive at the intersection point.

The use of the presence indications reduces the number of times that a shader program needs to be executed to check a texture to determine the presence of a primitive at an intersection point to determine whether to accept an intersection. In other words, the presence indications are used to determine fully absent and fully present regions of primitives thereby reducing the number of times that alpha testing needs to be performed, thereby skipping the more expensive alpha-test operation where possible. Alpha testing (i.e. running a shader program to check the alpha value of the texture at the intersection point) is an expensive operation in terms of latency and power consumption.

If a primitive is sub-divided into K sub-primitives, 2K bits are used for the presence indications for the primitive, and these bits would be included with the rest of the primitive data for the primitive in the intersection testing process. In the example shown in FIG. 2, K is 64, such that 128 bits are used for the presence indications for the primitive 202. This is a significant increase in the amount of primitive data used to describe a primitive.

Furthermore, UK patents GB2538856B and GB2522868B describe a rasterization rendering technique in which an opacity state map is used to indicate whether blocks of texels of a texture are fully opaque, fully transparent, partially transparent or a mixture of these states. The indications in the opacity state map can be used to accelerate the processing of punch through primitives in a rasterization system. Similar to the presence indications described above with reference to a ray tracing system, each of the opacity states in the rasterization system of GB2538856B and GB2522868B is represented with two bits.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of decompressing compressed data to determine one or more sub-primitive presence indications for use in a rendering system (e.g. for use in intersection testing in the rendering system), the method comprising:

receiving a block of compressed data for a block of sub-primitive presence indications; reading entropy encoded data from the block of compressed data;

performing entropy decoding on the entropy encoded data to determine a block of entropy decoded data values; and performing spatial recorrelation on the block of entropy decoded values to determine one or more of the sub-primitive presence indications in the block of sub-primitive presence indications, said performing spatial recorrelation comprising:
(a) for each of a plurality of lines of entropy decoded values in a first dimension within the block of entropy decoded values:
  for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and
(b) for each of a plurality of lines of entropy decoded values in a second dimension within the block of entropy decoded values:
  for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value.

Said one or more entropy decoded values in a line in the first dimension for which predicted values are determined may be alternate entropy decoded values in that line in the first dimension, and said one or more entropy decoded values in a line in the second dimension for which predicted values are determined may be alternate entropy decoded values in that line in the second dimension.

Said one or more other entropy decoded values in the line on which the determination of a predicted value is based may be adjacent to the entropy decoded value for which the predicted value is determined.

Said plurality of lines of entropy decoded values in a first dimension may comprise all of the lines of entropy decoded values in the first dimension within the block of entropy decoded values, and wherein said plurality of lines of entropy decoded values in a second dimension may comprise all of the lines of entropy decoded values in the second dimension within the block of entropy decoded values.

Each of the presence indications may indicate a presence state which is one of: (i) fully present, (ii) fully absent, and (iii) partially present.

A partially present presence state may be represented by a value of zero in the block of sub-primitive presence indications.

A fully present presence state may be represented by a value of one and a fully absent presence state may be represented by a value of two in the block of sub-primitive presence indications. Alternatively, a fully present presence state may be represented by a value of two and a fully absent presence state may be represented by a value of one in the block of sub-primitive presence indications.

Said replacing the entropy decoded value with a value of a sum of the entropy decoded value and the determined predicted value for the entropy decoded value may comprise performing a summation calculation using a modulo-3 operation to determine the value of the sum of the entropy decoded value and the determined predicted value for the entropy decoded value.

Said determining a predicted value for the entropy decoded value based on one or more other entropy decoded values in the line may be performed using a Predict function which operates in accordance with:

$$\text{Predict}(L, R) = \begin{cases} L & \text{when } L = R \\ 0 & \text{otherwise} \end{cases}$$

and said replacing the entropy decoded value with a value of a sum of the entropy decoded value and the determined predicted value for the entropy decoded value may be performed in accordance with:

$$d_{2i+1} := d_{2i+1} + \text{Predict}(d_{2i}, d_{2i+2}) \bmod 3$$

wherein $d_{2i}$ is the (2i)th entropy decoded value in the line, $d_{2i+1}$ is the (2i+1)th entropy decoded value in the line, and $d_{2i+2}$ is the (2i+2)th entropy decoded value in the line.

If $d_{2i+1}$ is the final entropy decoded value in the line, such that $d_{2i+2}$ does not exist in the block of entropy decoded values, then the value of $d_{2i}$ may be used in place of $d_{2i+2}$ in the Predict function.

The lines of entropy decoded values in the first dimension within the block of entropy decoded values may be rows of entropy decoded values within the block of entropy decoded values, and the lines of entropy decoded values in the second dimension within the block of entropy decoded values may be columns of entropy decoded values within the block of entropy decoded values. Alternatively, the lines of entropy decoded values in the first dimension within the block of entropy decoded values may be columns of entropy decoded values within the block of entropy decoded values, and the lines of entropy decoded values in the second dimension within the block of entropy decoded values may be rows of entropy decoded values within the block of entropy decoded values.

Said performing spatial recorrelation may further comprise, prior to (a) and (b):
(c) for each of a plurality of lines of entropy decoded values in the first dimension within a sub-block of entropy decoded values within the block of entropy decoded values:
  for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and
(d) for each of a plurality of lines of entropy decoded values in the second dimension within the sub-block of entropy decoded values:
  for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and
(e) interleaving the entropy decoded values from the sub-block with entropy decoded values in the block of entropy decoded values which have not yet been spatially recorrelated.

Said performing entropy decoding on the entropy encoded data to determine a block of entropy decoded data values may comprise:
  reading, from the entropy encoded data, for each subset of a plurality of subsets of encoded data values, an indication that identifies a number of bits that is used for each of the encoded data values in the subset; and parsing the encoded data values in the entropy encoded data based on the identified numbers of bits to thereby interpret the encoded data values.

The entropy decoded data values may be determined by selectively prepending leading zeroes to the interpreted encoded data values so that each of the entropy decoded data values has the same number of bits as each of the presence indications in the block of sub-primitive presence indications.

Each of the subsets of encoded data values may be a 2×2 subset of encoded data values.

Said performing entropy decoding on the entropy encoded data to determine a block of entropy decoded data values may comprise performing Huffman decoding.

Said performing entropy decoding on the entropy encoded data to determine a block of entropy decoded data values may comprise performing run length decoding.

The run length decoding may be performed according to either a raster scan order or a Morton order.

The method may further comprise:
receiving an indication of a sample position within the block of sub-primitive presence indications for which a presence indication is to be determined; and
determining a presence indication for the sample position using one or more of the determined sub-primitive presence indications in the block of sub-primitive presence indications.

The rendering system may be a ray tracing system and the method may further comprise using the determined presence indication at the sample position to determine the presence of a primitive at a point of intersection with a ray as part of performing intersection testing for the ray in the ray tracing system.

The rendering system may be a ray tracing system or a rasterization system.

There is provided a decompression unit configured to decompress compressed data to determine one or more sub-primitive presence indications for use in a rendering system (e.g. for use in intersection testing in the rendering system), the decompression unit being configured to receive a block of compressed data for a block of sub-primitive presence indications, the decompression unit comprising:
an entropy decoding module configured to perform entropy decoding on entropy encoded data that has been read from the block of compressed data to determine a block of entropy decoded data values; and
a spatial recorrelation module configured to perform spatial recorrelation on the block of entropy decoded values to determine one or more of the sub-primitive presence indications in the block of sub-primitive presence indications, said performing spatial recorrelation comprising:
(a) for each of a plurality of lines of entropy decoded values in a first dimension within the block of entropy decoded values:
for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and
(b) for each of a plurality of lines of entropy decoded values in a second dimension within the block of entropy decoded values:
for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value.

There may be provided a decompression unit configured to perform any of the decompression methods described herein.

There may be provided a method of compressing, into a block of compressed data, a block of sub-primitive presence indications for use in a rendering system (e.g. for use in intersection testing in the rendering system), the method comprising:
performing spatial decorrelation on the sub-primitive presence indications in the block of sub-primitive presence indications to determine spatially decorrelated presence indications, said performing spatial decorrelation comprising:
(a) for each of a plurality of lines of presence indications in a first dimension within the block of presence indications:
for one or more of the presence indications in the line:
(i) determining a predicted value for the presence indication based on one or more other presence indications in the line, and (ii) replacing the presence indication with a value of a difference between the presence indication and the determined predicted value for the presence indication; and
(b) for each of a plurality of lines of presence indications in a second dimension within the block of presence indications:
for one or more of the presence indications in the line:
(i) determining a predicted value for the presence indication based on one or more other presence indications in the line, and (ii) replacing the presence indication with a value of a difference between the presence indication and the determined predicted value for the presence indication;
performing entropy encoding on the spatially decorrelated presence indications to determine entropy encoded data; and
storing the entropy encoded data in the block of compressed data.

There may be provided a compression unit configured to compress, into a block of compressed data, a block of sub-primitive presence indications for use in a rendering system (e.g. for use in intersection testing in the rendering system), the compression unit comprising:
a spatial decorrelation module configured to perform spatial decorrelation on the sub-primitive presence indications in the block of sub-primitive presence indications to determine spatially decorrelated presence indications, said spatial decorrelation comprising:
(a) for each of a plurality of lines of presence indications in a first dimension within the block of presence indications:
for one or more of the presence indications in the line:
(i) determining a predicted value for the presence indication based on one or more other presence indications in the line, and (ii) replacing the presence indication with a value of a difference between the presence indication and the determined predicted value for the presence indication; and
(b) for each of a plurality of lines of presence indications in a second dimension within the block of presence indications:

for one or more of the presence indications in the line:
(i) determining a predicted value for the presence indication based on one or more other presence indications in the line, and (ii) replacing the presence indication with a value of a difference between the presence indication and the determined predicted value for the presence indication; and an entropy encoding module configured to perform entropy encoding on the spatially decorrelated presence indications to determine entropy encoded data and to store the entropy encoded data in the block of compressed data.

The compression unit or decompression unit may be embodied in hardware on an integrated circuit. There may be provided a method of manufacturing, at an integrated circuit manufacturing system, a compression unit or a decompression unit. There may be provided an integrated circuit definition dataset that, when processed in an integrated circuit manufacturing system, configures the system to manufacture a compression unit or a decompression unit. There may be provided a non-transitory computer readable storage medium having stored thereon a computer readable description of a compression unit or a decompression unit that, when processed in an integrated circuit manufacturing system, causes the integrated circuit manufacturing system to manufacture an integrated circuit embodying a compression unit or a decompression unit.

There may be provided an integrated circuit manufacturing system comprising: a non-transitory computer readable storage medium having stored thereon a computer readable description of the compression unit or decompression unit; a layout processing system configured to process the computer readable description so as to generate a circuit layout description of an integrated circuit embodying the compression unit or decompression unit; and an integrated circuit generation system configured to manufacture the compression unit or decompression unit according to the circuit layout description.

There may be provided computer program code for performing any of the methods described herein. There may be provided a non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7b shows a result of applying spatial decorrelation to the columns of presence indications in the block of presence indications shown in FIG. 7a;

Figure 1:
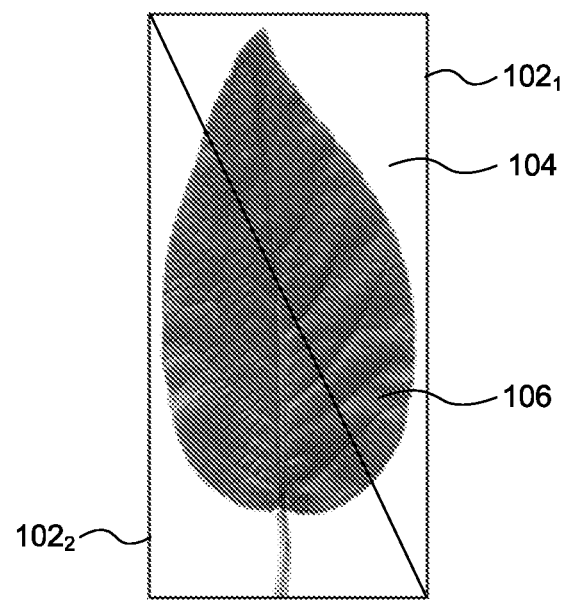
FIG. 1 shows a punch through texture applied to two primitives which form a quad.
Figure 2:
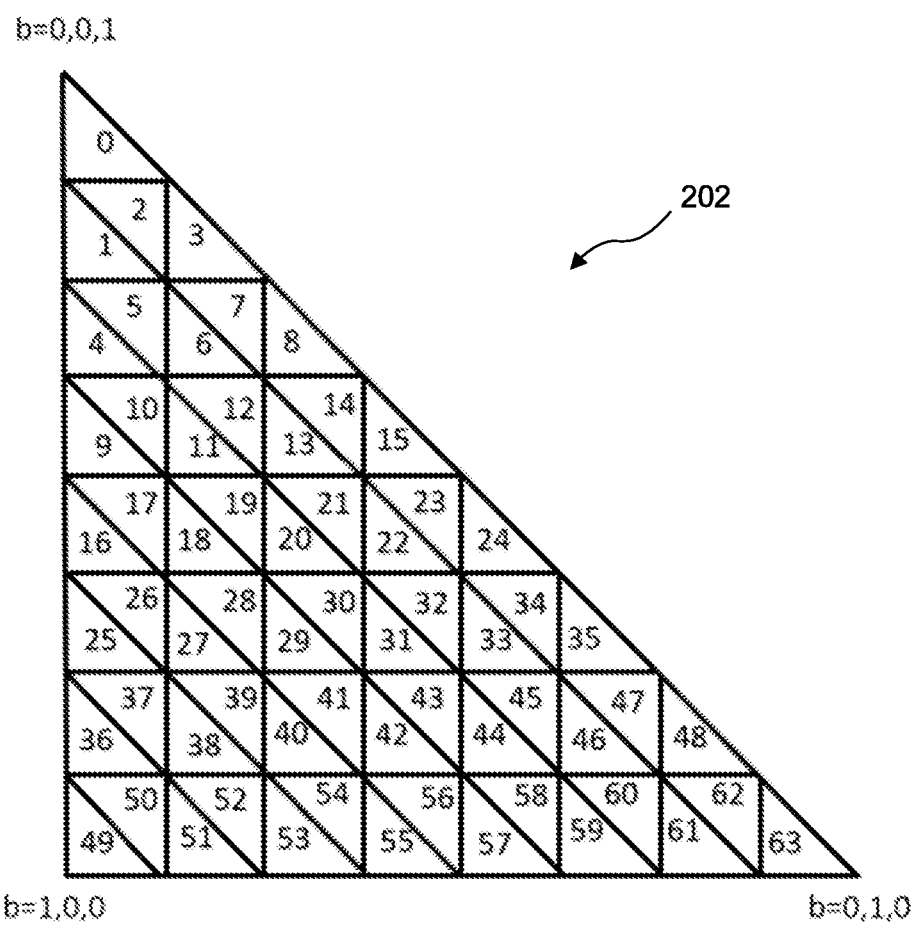
FIG. 2 shows a triangular primitive which is sub-divided into 64 sub-primitives.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. In the present disclosure, a sub-primitive presence indication is representative of a presence state of a corresponding sub-primitive.

In the ray tracing system described in the background section above, each of the presence indications is stored with 2 bits, such that if a primitive is sub-divided into K sub-primitives, 2K bits are used for the presence indications for the primitive. Reducing the amount of data used to represent the presence indications would be beneficial in terms of reducing the amount of memory needed to store the presence indications and reducing the amount of data transferred between different components in the ray tracing system. Therefore, the reduction in the amount of data used to represent the presence indications may reduce the latency, power consumption and silicon area of the ray tracing system.

As a simple example of how to compress the presence indications, it is noted that two bits are used for each presence indication to indicate one of three presence states (fully present, fully absent or partially present), so if we combine the presence information for multiple sub-primitives then the presence indications for a group of sub-primitives may be able to be represented with fewer than an average of 2 bits per sub-primitive. As an example, the presence indications for a group of 5 sub-primitives (i.e. $3^5=243$ possible combinations of presence states) could be stored in 8 bits (i.e. $2^8=256$ possible encodings). In this simple example, if a primitive is sub-divided into K sub-primitives, approximately 1.6K bits are used for the presence indications for the primitive. The compression of 2K bits to 1.6K bits represents a compression ratio of 80%, where the compression ratio is defined as the size of the compressed data divided by the size of the uncompressed data. Compressing data to a greater extent results in a smaller compression ratio.

In the examples described below, compression and decompression techniques are described which can compress the presence indications to a greater extent (i.e. achieve lower compression ratios) than in the simple example described above.

Note that having three states, as opposed to a simpler scheme with only "fully present" and "fully absent" states, is attractive from a quality point of view as a two state system is likely to lead to visible aliasing (i.e. jagged edges) unless, perhaps, an extremely high resolution, and thus memory intensive, mask is used. Further, though a two-state scheme may benefit from never having to run a shader to "check texture", it also means that some use cases which do need partial transparency, e.g. modelling a stained-glass window, would be suboptimal. Having said this, the examples described below in which a wavelet approach is used can be adapted by one skilled in the art, to a system with just two states.

Figure 3:
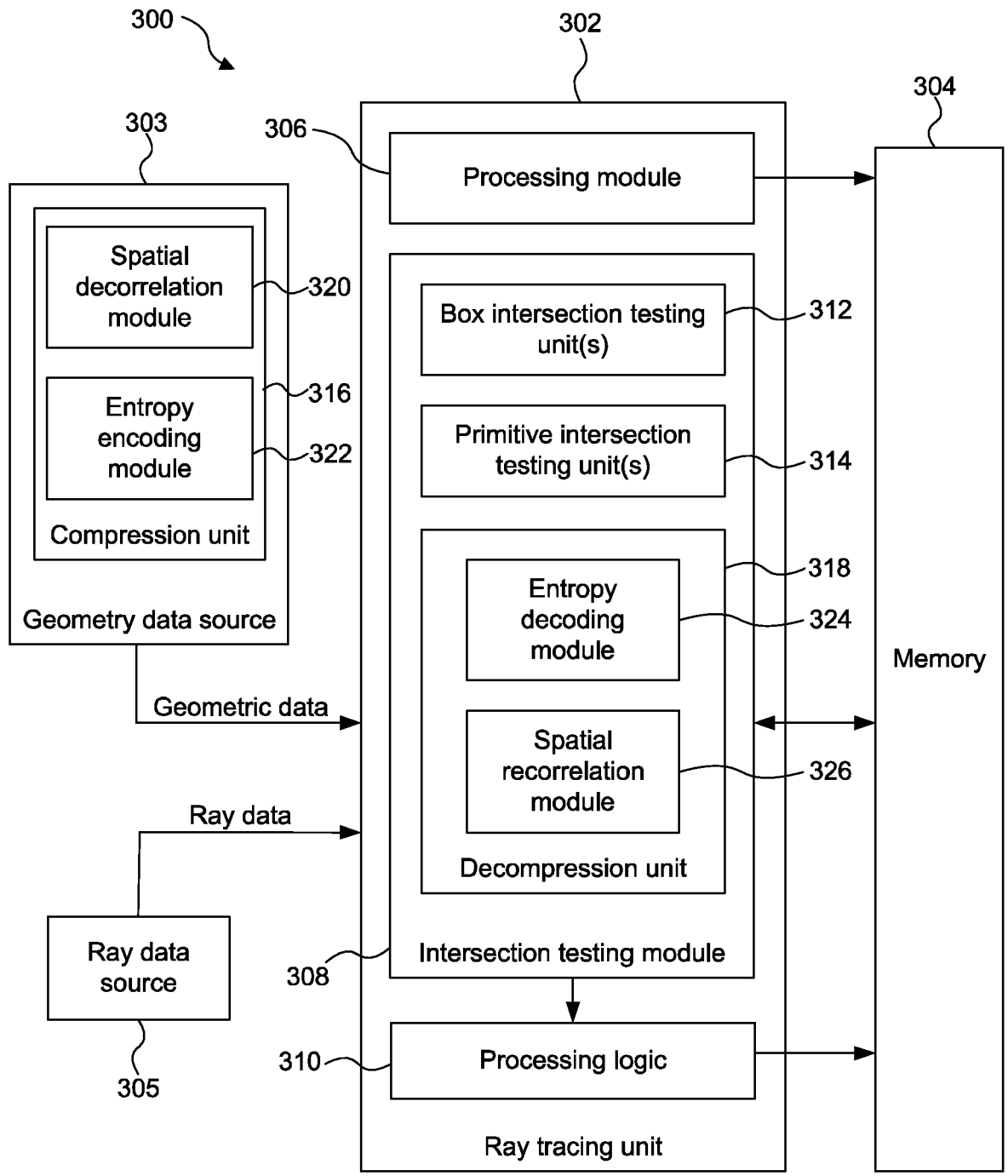
FIG. 3 shows a ray tracing system according to examples described herein.

FIG. 3 shows a ray tracing system 300 comprising a ray tracing unit 302 and a memory 304. The ray tracing system 300 also comprises a geometry data source 303 and a ray data source 305. The ray tracing unit 302 comprises a processing module 306, an intersection testing module 308 and processing logic 310. The intersection testing module 308 comprises one or more box intersection testing units 312, one or more primitive intersection testing units 314 and a decompression unit 318. The geometry data source comprises a compression unit 316. The compression unit 316 comprises a spatial decorrelation module 320 and an entropy encoding module 322. The decompression unit 318 comprises an entropy decoding module 324 and a spatial recorrelation module 326. In operation the ray tracing unit 302 receives geometric data defining objects within the 3D scene from the geometry data source 303. The ray tracing unit 302 also receives ray data defining rays that are to be tested for intersection from the ray data source 305. The rays may be primary rays or secondary rays. The processing module 306 is configured to generate an acceleration structure based on the geometric data, and to send the acceleration structure to the memory 304 for storage therein. After the acceleration structure has been stored in the memory 304, the intersection testing module 308 can retrieve nodes (e.g. comprising data defining axis-aligned boxes corresponding to the nodes) of the acceleration structure from the memory 304 to perform intersection testing of rays against the retrieved nodes. The box intersection testing unit(s) 312 perform intersection tests to determine whether or not a ray intersects each of the bounding boxes corresponding to nodes of the acceleration structure (where a miss can cull vast swathes of the hierarchical acceleration structure). If it is determined that a leaf node is intersected then the primitive intersection testing unit(s) 314 perform one or more primitive intersection tests to determine which object(s) (if any) the ray intersects. In this example, the primitives are triangles, or pairs of triangles, although it is noted that in other examples, the primitives could be other shapes, e.g. other convex planar polygons, such as rectangles (which includes squares), pentagons, hexagons, etc, or (parametric) curved surfaces The results of the intersection tests indicate which primitive in the scene a ray intersects, and the results may also indicate other intersection data, such as a position on the object at which the ray intersects the object (e.g. defined in terms of barycentric coordinates), and may also indicate a distance, e.g., Euclidean or as a (signed) multiple of ray lengths, along the ray that the intersection occurs. In some instances, the intersection determination may be based on whether the distance along the ray that the intersection occurs is between minimal and maximal clipping distances for the ray (which may be referred to as $t_{min}$ and $t_{max}$). The results of the intersection testing are provided to the processing logic 310. The processing logic 310 is configured to process the results of the intersection testing to determine rendered values representing the image of the 3D scene. The rendered values determined by the processing logic 310 can be passed back to the memory 304 for storage therein to represent the image of the 3D scene.

In the examples described herein the ray tracing system uses an acceleration structure in order to reduce the number of intersection tests that need to be performed for a ray against primitives. However, it is noted that some other examples might not use an acceleration structure, and may simply test rays against the primitives without first attempting to reduce the number of intersection tests that need to be performed using an acceleration structure.

When the primitive intersection testing unit(s) 314 of the intersection testing module 308 determine that a ray intersects a primitive which has partial presence then typically the intersection testing module 308 would need to stall while a shader program was executed on the processing logic 310 to resolve the presence of the primitive at the intersection point. Some of these stalls can be avoided by the use of the sub-primitive presence indications as described herein.

Compression and decompression of the sub-primitive presence indications is performed, in examples described below, using a wavelet approach, which is usually using a lossless compression approach. In this approach, a block of sub-primitive presence indications is compressed into a block of compressed data for use in intersection testing in a ray tracing system. The inventors have realised that because the primitives represent physical structures, the distribution of presence indications is rarely random. Sub-primitives with a particular presence state are often next to sub-primitives with the same presence state. This order (i.e. non-randomness) to the distribution of presence states can be leveraged to achieve better compression of the block of presence indications.

It is noted that in the example shown in FIG. 3 the compression unit 316 is implemented in the geometry data source 303, but in other examples, the compression unit 316 could be implemented in a different component to the geometry data source 303, and in some examples may be implemented in the ray tracing unit 302, e.g. as part of the intersection testing module 308. Furthermore, in the example shown in FIG. 3, the decompression unit 318 is implemented as part of the intersection testing module 308, but in other examples it could be implemented somewhere other than as part of the intersection testing module 308.

Figure 4:
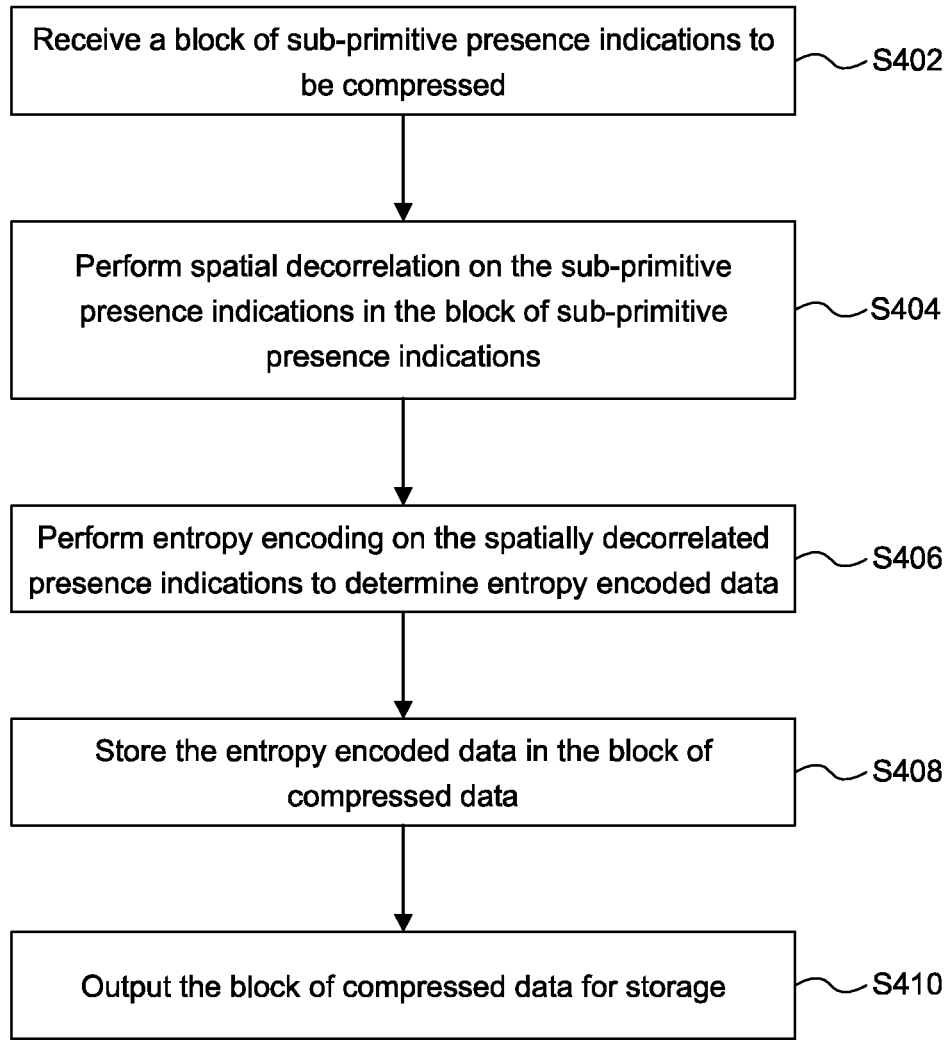
FIG. 4 is a flow chart for a method of compressing a block of sub-primitive presence indications into a block of compressed data.

A method of compressing a block of sub-primitive presence indications into a block of compressed data is described at a high level with reference to the flow chart of FIG. 4. This compression is performed by the compression unit 316.

Figure 5A:
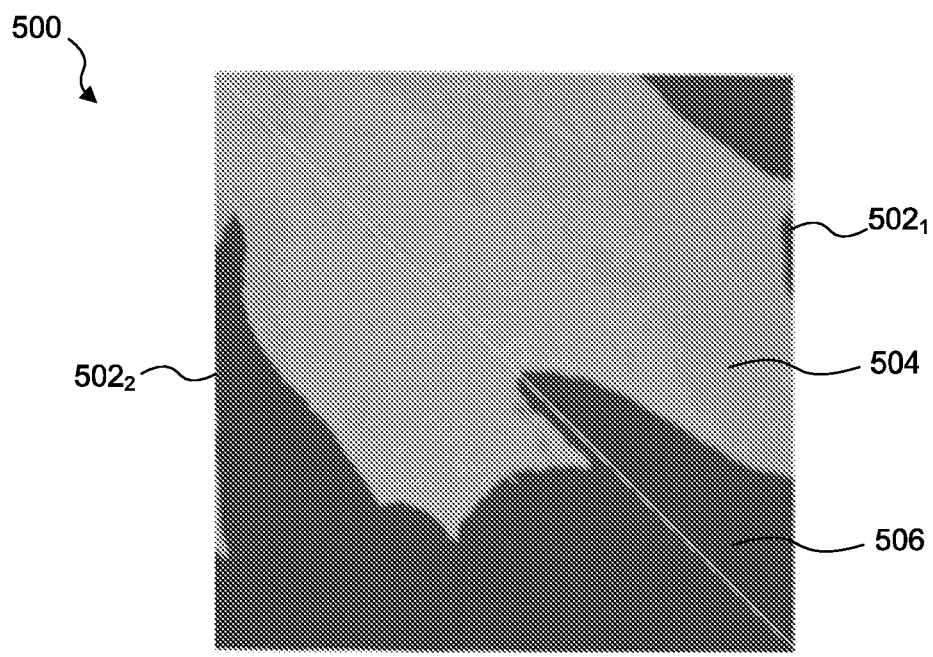
FIG. 5a shows an object which has partial presence.
Figure 5B:
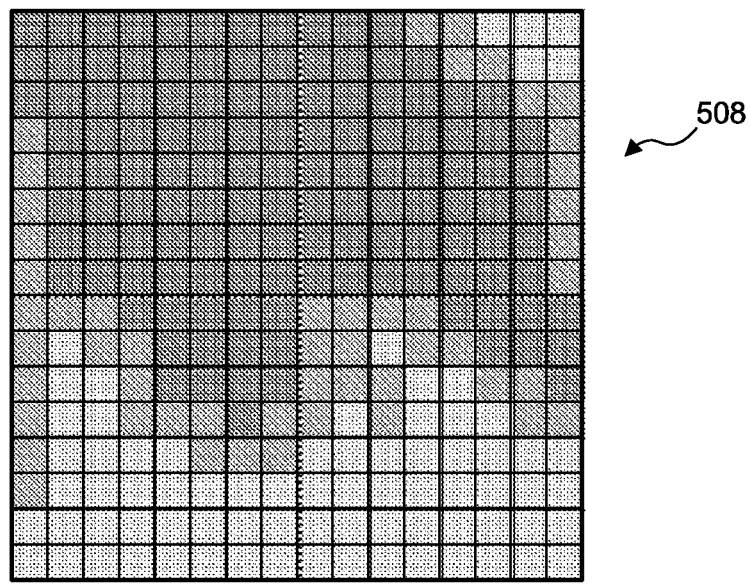
FIG. 5b shows a block of presence indications for the object shown in FIG. 5a, the block of presence indications comprising 256 presence indications in a 16×16 arrangement.

In step S402 the compression unit 316 receives a block of sub-primitive presence indications to be compressed. For example, FIG. 5a shows an object 500 which has partial presence. In this example the object is part of a leaf and is represented with a pair of triangular primitives $502_1$ and $502_2$ that form a quad because they share an edge. FIG. 5b shows a block of presence indications 508 for the object which is received at the compression unit 316. The object is divided into 256 sub-primitives arranged in a 16×16 square. In other examples, the block may have a different number of sub-primitives and they may be arranged into other shapes (e.g. rectangles, or triangles). In FIG. 5b each presence indication is represented with one of three hatchings to represent one of the three possible presence states. In particular, presence indications that indicate that a respective sub-primitive is fully present are represented with dark hatching; presence indications that indicate that a respective sub-primitive is fully absent are represented with light hatching; and presence indications that indicate that a respective sub-primitive is partially present are represented with mid-level hatching. As mentioned above, the presence indications that are received in step S402 may be determined in a pre-processing step, which may be performed by an Application Programming Interface (API) or as part of a process of creating the primitives and textures, e.g. by a user. Each of the (uncompressed) sub-primitive presence indications is represented with 2 bits to indicate one of the three presence states: (i) fully present, (ii) fully absent, or (iii) partially present. The presence indications are ternary data, i.e. they can have one of three possible values.

In step S404 the spatial decorrelation module 320 of the compression unit 316 performs spatial decorrelation on the sub-primitive presence indications in the block of sub-primitive presence indications 508 to determine spatially decorrelated presence indications. Each of the three different presence states (partially present, fully present and fully absent) are assigned a value. In the examples described herein the partially present state is assigned a value of zero. In some cases, a fully present state is assigned a value of one and a fully absent state is assigned a value of two; but in other cases a fully present state is assigned a value of two and a fully absent state is assigned a value of one. As will be seen below, a modulo-3 operation is used in the spatial decorrelation process performed in step S404, and when a modulo-3 operation is used then a value of 2 is congruent to a value of −1.

In step S406 the entropy encoding module 322 of the compression unit 316 performs entropy encoding on the spatially decorrelated presence indications to determine entropy encoded data.

In step S408 the compression unit 316 stores the entropy encoded data in the block of compressed data.

In step S410 the compression unit 316 outputs the block of compressed data for storage. The block of compressed data may be stored with the primitive data for the primitive, e.g. in the geometry data source 303. The block of compressed data may be passed with the primitive data for the primitive to the ray tracing unit 302 and may be stored in the memory 304 and/or in memory within the intersection testing module 308 for use by the primitive intersection testing unit(s) 314 as part of performing intersection testing for a ray with respect to the primitive.

Performing spatial decorrelation (e.g. in step S404) tends to reduce the magnitude of the values in the block of presence indications. In particular, as can be seen in the more detailed description below, after the spatial decorrelation many of the spatially decorrelated presence indications have a value of zero. Entropy encoding results in entropy encoded data which has a variable length, wherein the length (or "size") of the entropy encoded data depends upon the values of the data on which the entropy encoding is performed. In particular, in some entropy encoding schemes, e.g., a biased Elias coding, if the values on which the entropy encoding is performed have relatively low magnitudes then the entropy encoded data will tend to have a relatively small size, whereas if the values on which the entropy encoding is performed have relatively high magnitudes then the entropy encoded data will tend to have a relatively large size. So by performing spatial decorrelation (which reduces the magnitude of the values of the presence indications) and then performing entropy encoding on the spatially decorrelated presence indications, the data representing the presence indications is normally compressed. In particular, if the presence indications have an organised structure such that many of the presence indications have the same state as their neighbouring presence indications in the block of presence indications 508 then the spatially decorrelated values will have low values and the entropy encoded data will tend to have a smaller size; whereas if the presence indications have little structure (e.g. if they are mostly random or pseudo-random) such that fewer of the presence indications have the same state as their neighbouring presence indications in the block of presence indications 508 then the spatially decorrelated values will have high values and the entropy encoded data will tend to have a larger size. As described above, primitives that are processed in a ray tracing system represent physical structures, and the distribution of sub-primitive presence indications for a primitive is not random.

Figure 6:
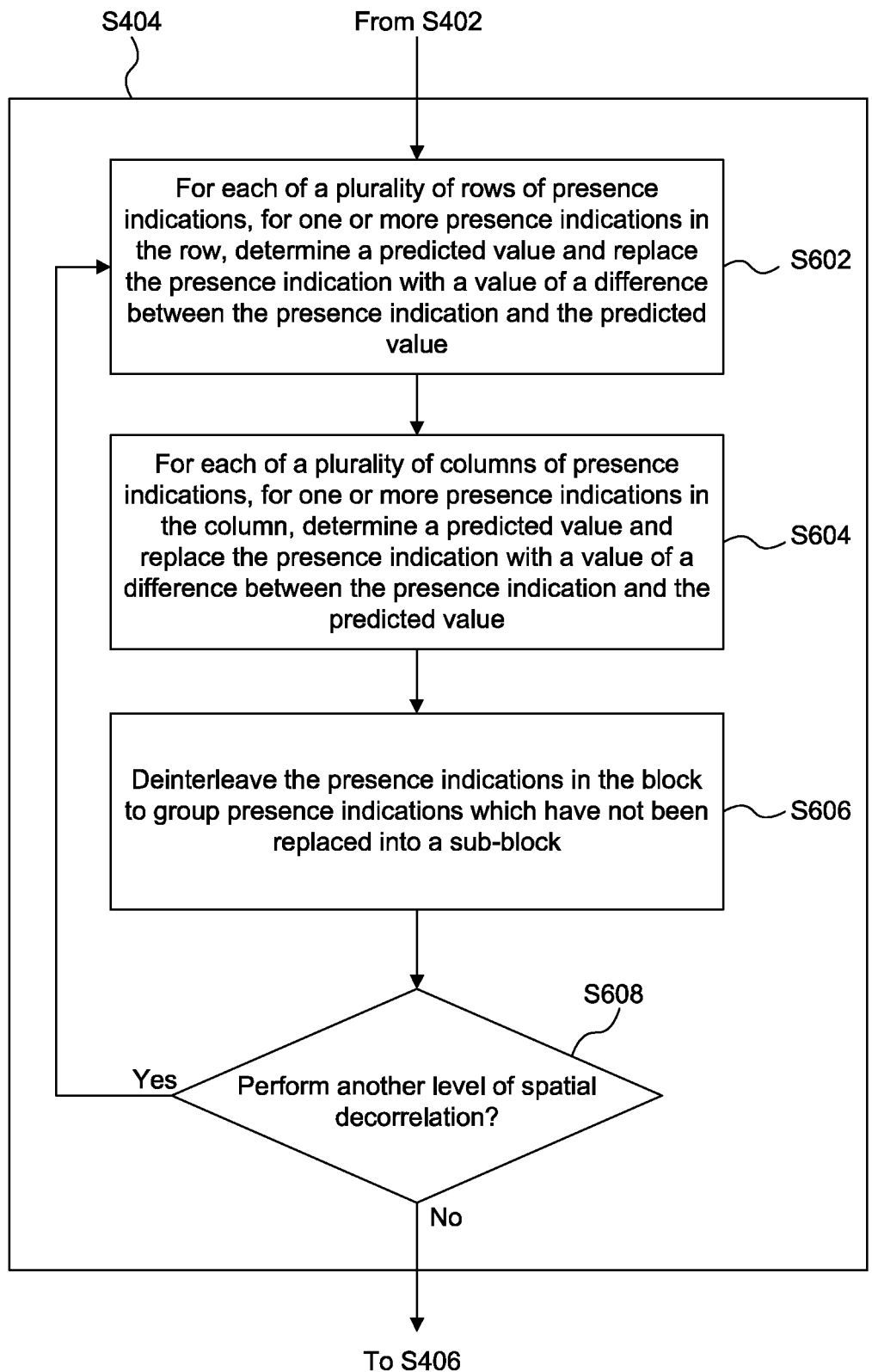
FIG. 6 is a flow chart illustrating an example process for performing spatial decorrelation on a block of sub-primitive presence indications.

FIG. 6 is a flow chart illustrating an example process performed by the spatial decorrelation module 320 for performing spatial decorrelation in step S404 on a block of sub-primitive presence indications. The spatial decorrelation module 320 receives a block of presence indications, e.g. the block 508 shown in FIG. 5b.

In step S602, for each of a plurality of rows (e.g. for all of the rows) of presence indications, for one or more of the presence indications in the row (e.g. for alternate presence indications in the row) the spatial decorrelation module 320: (i) determines a predicted value for the presence indication based on one or more other presence indications in the row (e.g. based on adjacent (or neighbouring) presence indications in the row), and (ii) replaces the presence indication with a value of a difference between the presence indication and the determined predicted value for the presence indication.

In step S604, for each of a plurality of columns (e.g. for all of the columns) of presence indications, for one or more of the presence indications in the column (e.g. for alternate presence indications in the column) the spatial decorrelation module 320: (i) determines a predicted value for the presence indication based on one or more other presence indications in the column (e.g. based on adjacent (or neighbouring) presence indications in the column), and (ii) replaces the presence indication with a value of a difference between the presence indication and the determined predicted value for the presence indication.

In the example shown in FIG. 6, the spatial decorrelation is performed for the rows of the block of presence indications and then for the columns, but in other examples the spatial decorrelation could be performed for the columns of the block of presence indications and then for the rows (i.e. steps S602 and S604 could be reordered).

As described above, with reference to the block of presence indications 508 shown in FIG. 5b, in an example a presence indication representing a partially present presence state has a value of zero, a presence indication representing a fully present presence state has a value of one, and a presence indication representing a fully absent presence state has a value of two.

In each of steps S602 and S604, in which spatial decorrelation is performed for lines presence indications in either a first dimension or a second dimension, alternate presence indications can each be replaced with a value of a difference between the presence indication and a predicted value for the presence indication by performing a difference calculation using a modulo-3 operation to determine the value of the difference between the presence indication and the predicted value for the presence indication. The use of the modulo-3 operation means that a value of 2 is congruent to a value of $-1$.

For example, a predicted value for a presence indication based on two adjacent presence indications in the same line can be performed using a Predict function which operates in accordance with:

$$\text{Predict}(L, R) = \begin{cases} L \text{ when } L = R \\ 0 \text{ otherwise} \end{cases},$$

and alternate presence indications ($p_{2i+1}$) can be replaced with a value of a difference between the presence indication ($p_{2i+1}$) and a predicted value for the presence indication in accordance with:

$$p_{2i+1} := p_{2i+1} - \text{Predict}(p_{2i}, p_{2i+2}) \bmod 3,$$

where $p_{2i}$ is the $(2i)^{th}$ presence indication in the line, $p_{2i+1}$ is the $(2i+1)^{th}$ presence indication in the line, and $p_{2i+2}$ is the $(2i+2)^{th}$ presence indication in the line. i is an integer in the range from 0 to $(N/2)-1$ where N is the number of lines (e.g. rows or columns) in the block or sub-block for which spatial decorrelation is being performed. In this way, each 'odd' presence indication in each line can be replaced with a linear prediction of its value based on the neighbouring (i.e. adjacent) 'even' presence indications in the line.

Table 1 below shows the output of the Predict function for different inputs (L, R), where a value of $-1$ is congruent to a value of 2.

TABLE 1

| L | R | Predict(L, R) |
|---|---|---|
| $-1$ | $-1$ | $-1$ |
| $-1$ | 0 | 0 |
| $-1$ | 1 | 0 |
| 0 | $-1$ | 0 |
| 0 | 0 | 0 |
| 0 | 1 | 0 |
| 1 | $-1$ | 0 |
| 1 | 0 | 0 |
| 1 | 1 | 1 |

It can be seen from Table 1 that the output of the Predict function is zero unless $L=R\neq 0$, in which cases the output of the Predict function is equal to L (which is equal to R). It can also be seen from Table 1 that the Predict function is functionally equivalent to a function of $$\text{Truncate}\left(\frac{L+R}{2}\right),$$

which represents an average of the input values rounded towards zero.

If $p_{2i+1}$ is the final presence indication in the line, such that $p_{2i+2}$ does not exist in the block of presence indications, then the value of $p_{2i}$ is used in place of $p_{2i+2}$ in the Predict function. For example, for presence indications on the right boundary of the block of presence indications step S602 predicts the presence indication based on just the adjacent presence indication to the left of the presence indication being predicted.

Figure 7A:
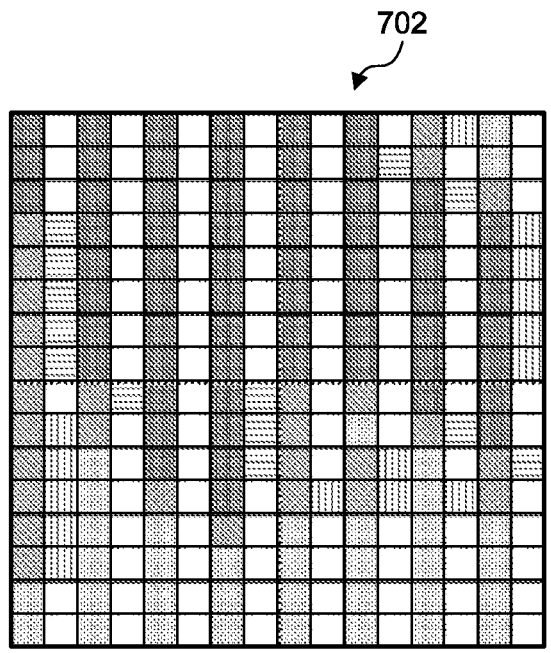
FIG. 7a shows a result of applying spatial decorrelation to the rows of presence indications in the block of presence indications shown in FIG. 5b.

FIG. 7a shows a result 702 of applying spatial decorrelation in step S602 to the rows of presence indications in the block of presence indications shown in FIG. 5b. As in FIG. 5b, in FIG. 7a, dark hatching represents a presence indication with a fully present presence state (which has a value of 1), mid-level hatching represents a presence indication with a partially present presence state (which has a value of 0), and light hatching represents a presence indication with a fully absent presence state (which has a value of 2, which is congruent to $-1$). Furthermore, in FIG. 7a, a white square represents a spatially decorrelated presence indication having a value of zero, a square with horizontal line hatching represents a spatially decorrelated presence indication having a value of 1, and a square with vertical line hatching represents a spatially decorrelated presence indication having a value of 2 (which is congruent to $-1$).

Figure 7B:
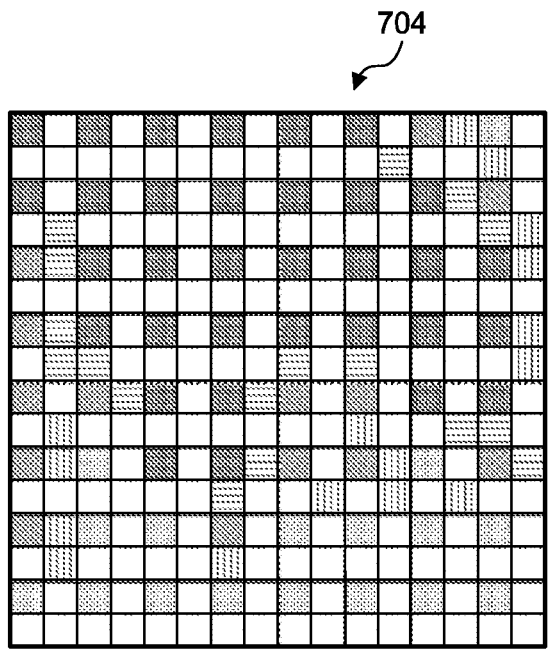

FIG. 7b shows a result 704 of applying spatial decorrelation to the columns of presence indications in the block of presence indications shown in FIG. 7a.

Figure 7C:
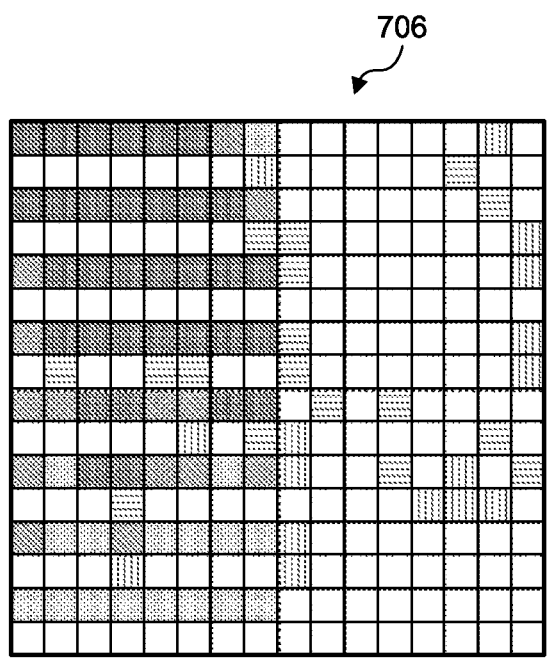
FIG. 7c shows a result of deinterleaving the columns of presence indications in the block of presence indications shown in FIG. 7b.
Figure 7D:
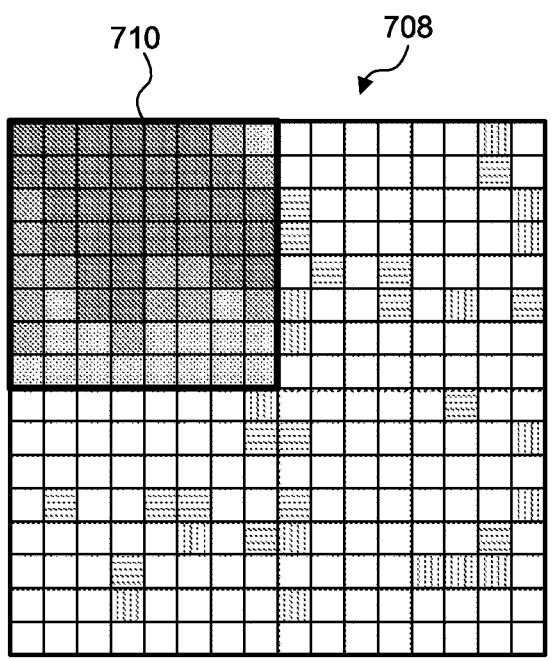
FIG. 7d shows a result of deinterleaving the rows of presence indications in the block of presence indications shown in FIG. 7c.

In step S606 the spatial decorrelation module 320 deinterleaves the presence indications in the block to thereby group the presence indications which have not been replaced into a sub-block within the block of presence indications. FIG. 7c shows a result 706 of deinterleaving the columns of presence indications in the block of presence indications shown in FIG. 7b, i.e. to group all of the columns of presence indications which have not been replaced into the left half of the block 706. FIG. 7d shows a result 708 of deinterleaving the rows of presence indications in the block of presence indications shown in FIG. 7c, i.e. to group all of the rows of presence indications which have not been replaced into the top half of the block 708. In this way, the spatial decorrelation module 320 deinterleaves the presence indications to thereby group the presence indications which have not been replaced into a sub-block 710 which is in the top left quadrant of the block of presence indications. In other words, in step S606 the values are deinterleaved by moving even rows and columns to the top left of the block. The top right quadrant of the block of presence indications 708 shown in FIG. 7*d* includes presence indications which are: (i) in rows which include some presence indications which have been replaced, and (ii) in columns which do not include any presence indications which have been replaced. The bottom left quadrant of the block of presence indications 708 shown in FIG. 7*d* includes presence indications which are: (i) in columns which include some presence indications which have been replaced, and (ii) in rows which do not include any presence indications which have been replaced. The bottom right quadrant of the block of presence indications 708 shown in FIG. 7*d* includes presence indications which are: (i) in rows which do not include any presence indications which have been replaced, and (ii) in columns which do not include any presence indications which have been replaced.

Then the spatial decorrelation process can be repeated on the top left quarter, i.e. on the sub-block 710. In step S608 the spatial decorrelation module 320 determines whether another level of spatial decorrelation is to be performed. If another level of spatial decorrelation is to be performed then the method passes from step S608 back to step S602 and the spatial decorrelation is performed on the sub-block 710.

Figure 7E:
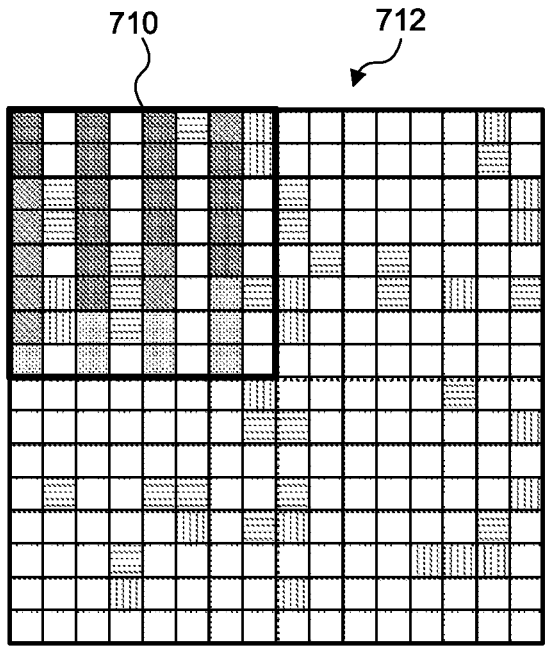
FIG. 7e shows a result of applying spatial decorrelation to the rows of presence indications in the sub-block of presence indications shown in FIG. 7d.

In this iteration, in step S602, for each of a plurality of rows of presence indications within the sub-block of presence indications 710 (e.g. for all of the rows of presence indications within the sub-block 710), for one or more of the presence indications in the row (e.g. for alternate presence indications in the row) the spatial decorrelation module 320: (i) determines a predicted value for the presence indication based on one or more other presence indications (e.g. adjacent presence indications) in the row within the sub-block 710, and (ii) replaces the presence indication with a value of a difference between the presence indication and the determined predicted value for the presence indication. FIG. 7*e* shows a result 712 of applying spatial decorrelation to the rows of presence indications in the sub-block of presence indications 710 shown in FIG. 7*d*.

Figure 7F:
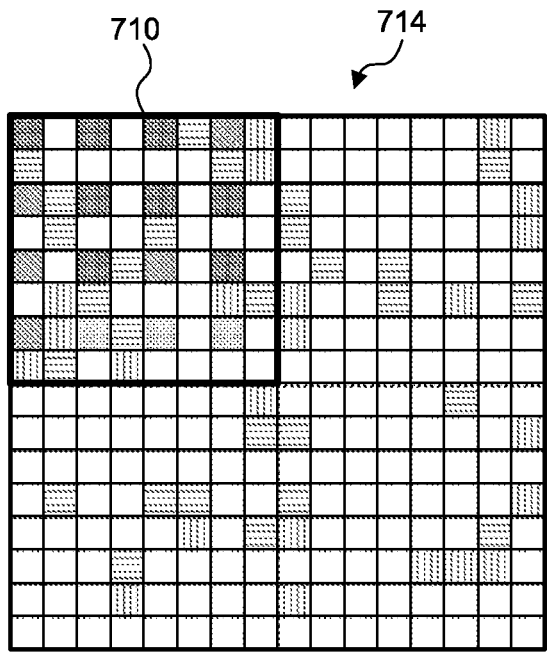
FIG. 7f shows a result of applying spatial decorrelation to the columns of presence indications in the sub-block of presence indications shown in FIG. 7e.

In this iteration, in step S604, for each of a plurality of columns of presence indications within the sub-block of presence indications 710 (e.g. for all of the columns of presence indications within the sub-block 710), for one or more of the presence indications in the column (e.g. for alternate presence indications in the column) the spatial decorrelation module 320: (i) determines a predicted value for the presence indication based on one or more other presence indications (e.g. adjacent presence indications) in the column within the sub-block 710, and (ii) replaces the presence indication with a value of a difference between the presence indication and the determined predicted value for the presence indication. FIG. 7*f* shows a result 714 of applying spatial decorrelation to the columns of presence indications in the sub-block of presence indications 710 shown in FIG. 7*e*.

Figure 7G:
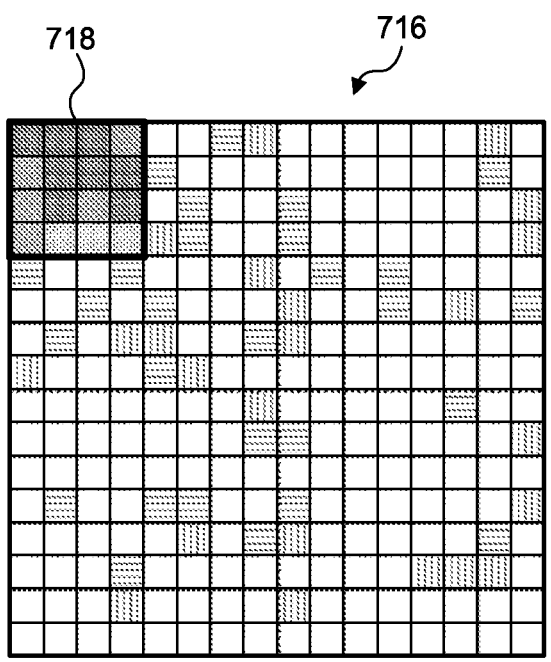
FIG. 7g shows a result of deinterleaving the rows and columns of presence indications in the sub-block of presence indications shown in FIG. 7f.

In this iteration, in step S606 the spatial decorrelation module 320 deinterleaves the presence indications in the sub-block 710 to thereby group the presence indications which have not been replaced into a second level sub-block within the block of presence indications. FIG. 7*g* shows a result 716 of deinterleaving the rows and columns of presence indications in the sub-block of presence indications 710 shown in FIG. 7*f*, i.e. to group the presence indications which have not been replaced into a second level sub-block 718 which is in the top left quadrant of the sub-block of presence indications. In other words, in step S606 the values are deinterleaved by moving even rows and columns to the top left of the sub-block.

In step S608 the spatial decorrelation module 320 determines whether another level of spatial decorrelation is to be performed. This process could be repeated one or two more times. If another level of spatial decorrelation is to be performed then the method passes from step S608 back to step S602 and the spatial decorrelation is performed on the second level sub-block 718. If another level of spatial decorrelation is not to be performed then the spatial decorrelation process (in step S404) is finished and the method passes from step S608 to step S406. In this example there are two levels of spatial decorrelation. In other examples there may be (only) one level of spatial decorrelation or more than two levels of spatial decorrelation, e.g. there may be three or four levels of spatial decorrelation.

Figure 7H:
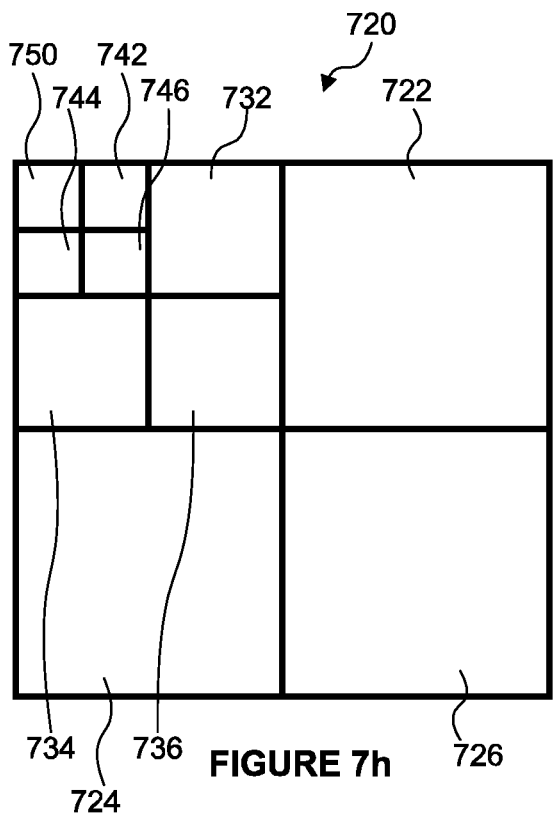
FIG. 7h illustrates different regions within the spatially decorrelated block of presence indications.

FIG. 7*h* illustrates different regions within a spatially decorrelated block of presence indications 720 in which three levels of spatial decorrelation have been applied. The three levels may be referred to as 'high', 'medium' and 'low'. The Top Right quadrant 722 of the block 720 is a representation of high frequency information content in the horizontal direction. The bottom left quadrant 724 of the block 720 is a representation of high frequency information in the vertical direction. The bottom right quadrant 726 of the block 720 is a representation of high frequency information in a diagonal direction. Subdividing the top left quadrant into four smaller quadrants, we recursively get: (i) in the top right smaller quadrant 732, a representation of 'medium' frequency information in the horizontal direction, (ii) in the bottom left smaller quadrant 734, a representation of 'medium' frequency information in the vertical direction, and (iii) in the bottom right smaller quadrant 736, a representation of 'medium' frequency information in the diagonal direction. This process can be repeated according to how many wavelet steps have been applied. FIG. 7*h* shows that the process has been repeated a third time, wherein the top left 'smaller' quadrant has been subdivided into four 'even smaller' quadrants, to give: (i) in the top right even smaller quadrant 742, a representation of low frequency information in the horizontal direction, (ii) in the bottom left even smaller quadrant 744, a representation of low frequency information in the vertical direction, and (iii) in the bottom right even smaller quadrant 746, a representation of low frequency information in the diagonal direction. The remaining top left even smaller quadrant 750 represents the sub-sampled source data, i.e. it represents presence indications which have not been replaced by the spatial decorrelation process.

In the encoding schemes, the non-decorrelated portion of the data, i.e corresponding to the top left portion of the resultant data, shown as the sub-block 718 in FIG. 7*g* or as the even smaller quadrant 750 in FIG. 7*h*, may be stored directly at 2 bits per presence indication.

Considering just the decorrelated results, the result of the spatial decorrelation process (step S404) is that the block comprises many more zeros than ones or twos, e.g. as shown in FIG. 7*g* where white squares represent values of zero. In the example shown in FIG. 7*g* 189 of the decorrelated values (i.e. 79% of the 240 decorrelated values) are zero and 51 of the decorrelated values (i.e. 21% of the 240 decorrelated values) are non-zero. The more spatial correlation in the original image the more zeros there will be in the block, and therefore the greater compression can be achieved by the entropy encoding.

The entropy encoding performed by the entropy encoding module 322 may be different in different examples.

One example entropy encoding scheme is based on Huffman coding. From evaluation of a set of sample data, the probability, $P_0$, of a decorrelated square having a zero coefficient is typically 0.7~0.8, while the probability, $P_1$, of it being a one is typically 0.1~0.15. Similarly, the probability of a two, $P_2$, is also typically 0.1~0.15. It is noted that $P_0+P_1+P_2=1$. With these probabilities, Huffman's technique, parsing from LSB to MSB, may suggest an encoding such as: A zero value would be represented by the binary string "0", a value of one by "01" and a value of two by "11". A person skilled in the art will appreciate there are equivalent encodings, e.g. one such being "1", "00", "10". Those skilled in the art will appreciate how to construct the following example from such alternative encodings. With this scheme, the expected encoding bits per value is $P_0+2(P_1+P_2)$.

A common problem, however, with entropy encoding is the difficulty of random access when decoding, i.e. rapidly deriving an arbitrary value (or contiguous set of values starting from an arbitrary index), from the encoded string can be challenging. As a simple example, the following 6 values "One, Zero, One, Two, Zero, One", (listed in a right to left order, from 'first' value, indexed as 0, on the 'right' to the last, indexed as 5, on the 'left') would be represented in the above Huffman encoding by the binary string "0100111001". If one wanted to obtain, for example, the value at index 3, it is not immediately clear where the encoding bit or bits for that value reside in the string without sequentially decoding the values corresponding to indices 0, 1, and 2 since the lengths of each is not known in advance. This becomes increasingly difficult with increasing numbers of encoded values—the cost of decoding item N is O(N).

To help alleviate this issue, in another example encoding, the Huffman codes are instead separated into a prefix bit, which is always present, and an optional suffix bit, which is only present for the values of One or Two. All prefix bits are stored contiguously, as are all the suffix bits. In this encoding scheme, for FIG. 7g, there would always be 240 prefix bits. These are stored at a known offset in a data structure and so, for a given value, can be randomly accessed. The start of the suffix bits is also stored at a known offset, but the content is of variable length—in the example of FIG. 7g there would be 51 suffix bits.

The decode process for the value at index k may proceed as follows: Bit k in the prefix bits can be randomly accessed (in hardware via a MUX or software via shifts and masks) since all values are present. If that bit has value '0', then the corresponding value is automatically zero and no further decoding is necessary. If, however, the found prefix bit is '1', it is necessary to find the suffix bit corresponding to the k'th value. This can be achieved as follows. A bit mask is constructed which has all LSBs up to, but not including, bit k, set to 1 and all others cleared to zero. A bitwise AND is performed between the mask and the prefix bits—counting/summing the number of set bits in the result is produces a numerical offset. This offset represents the position, in the suffix bits, of the suffix for the Kth value, which can then be accessed via a MUX or shifts/mask.

A short run of consecutive values, starting at the k'th value, may also use the above approach to obtain the position in the of the data for the kth value but then may revert to standard value-by-value decoding to obtain the remaining values.

Figure 8:
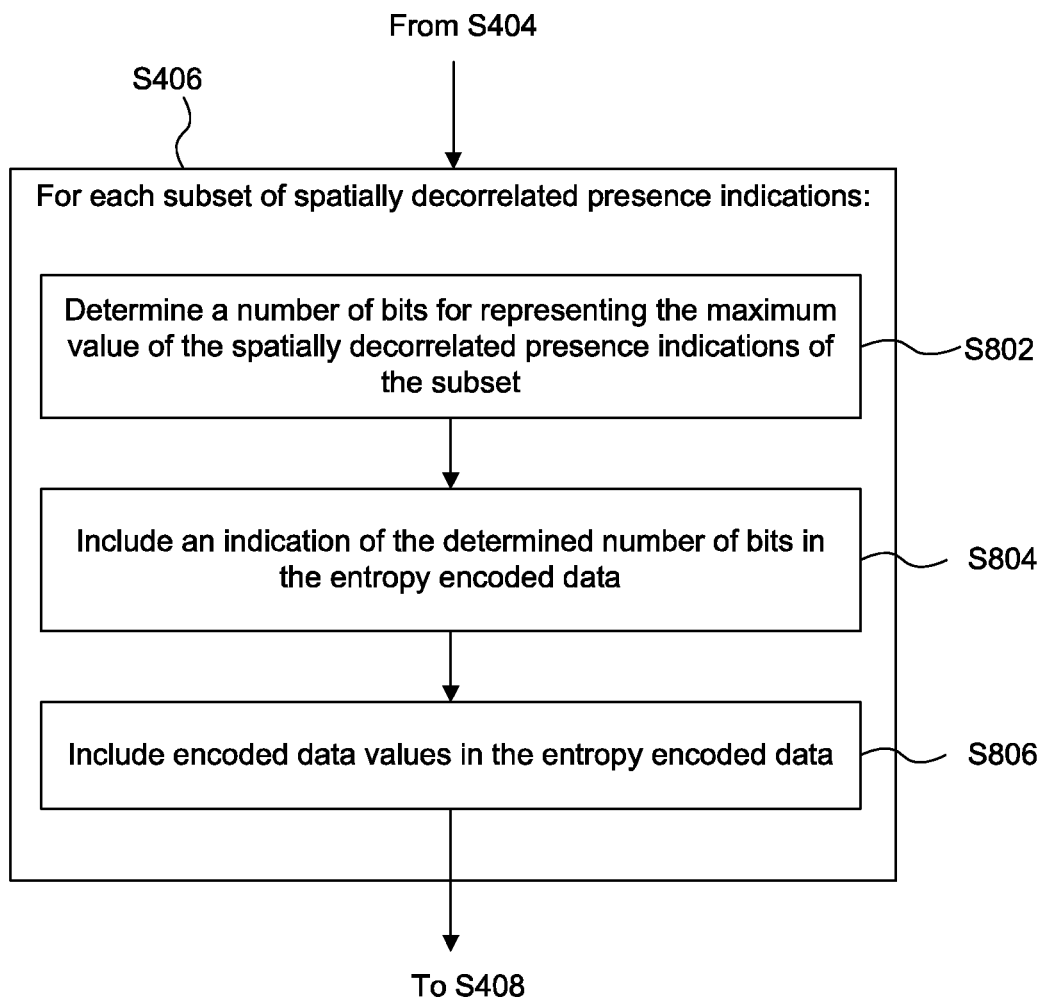
FIG. 8 is a flow chart illustrating an example process for performing entropy encoding on spatially decorrelated presence indications.
Figure 9:
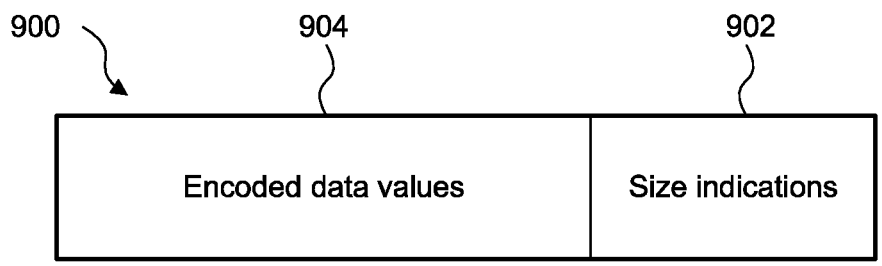
FIG. 9 shows a block of compressed data.

With reference to FIGS. 8 and 9, in another encoding scheme, the random access may be further simplified but at likely cost of less compression. FIG. 8 is a flow chart illustrating an example process for performing entropy encoding on spatially decorrelated presence indications in step S406 to determine entropy encoded data. FIG. 9 shows a block of entropy encoded data 900 which includes size indications 902 and encoded data values 904.

A block of spatially decorrelated presence indications (e.g. as shown in FIG. 7g) is received at the entropy encoding module 322. The block of spatially decorrelated presence indications 716 is subdivided into a plurality of subsets of spatially decorrelated presence indications. Each of the subsets may, for example, be a 2×2 subset of spatially decorrelated presence indications. In other examples, the subsets may be different sizes and/or shapes, e.g. they may be 4×4 or 2×4 subsets of spatially decorrelated presence indications. Steps S802, S804 and S806 shown in FIG. 8 are performed for each of the subsets of spatially decorrelated presence indications.

In step S802 the entropy encoding module 322 determines a number of bits which can be used to represent the maximum value of the spatially decorrelated presence indications in the subset. For example, the determined number of bits may be the minimum number of bits which can be used to losslessly represent the maximum value of the spatially decorrelated presence indications in the subset. Alternatively, module 322 may identify the set of indications used in the subset and class each into one of four classes: All decorrelated presence values are 0, all values are either 0 or 1, all values are either 0 or 2, or the values may be any of 0, 1 or 2. These, respectively imply the subset will require 0, N, N, or 2N bits where N is the number of presence values in the subset.

In step S804 the entropy encoding module 322 includes, in the size indications field 902 of the entropy encoded data 900, an indication of the determined number of bits for the subset.

In step S806 the entropy encoding module 322 includes, in the encoded data values field 904 of the entropy encoded data 900, encoded data values representing the spatially decorrelated presence indications in the subset, wherein each of the encoded data values has the determined number of bits for the subset.

For example, if the four values in a 2×2 subset are 2, 1, 1 and 0, then the minimum number of bits which can be used to losslessly represent the maximum value in the subset is two. So for this subset, the four encoded data values can be represented (in binary) as 10, 01, 01 and 00 in the encoded data values field 904, and a size indication indicating 2 bits can be stored for the subset in the size indications field 902. As another example, if the four values in a 2×2 subset are 0, 1, 1 and 0, then the minimum number of bits which can be used to losslessly represent the maximum value in the subset is one. So for this subset, the four encoded data values can be represented (in binary) as 0, 1, 1 and 0 in the encoded data values field 904, and a size indication indicating 1 bit can be stored for the subset in the size indications field 902. As another example, if the four values in a 2×2 subset are 0, 0, 0 and 0, then the minimum number of bits which can be used to losslessly represent the maximum value in the subset is zero. So for this subset, the four values can be represented without storing any bits in the encoded data values field 904, and a size indication indicating 0 bits can be stored for the subset in the size indications field 902. Finally, as the size indication will require 2 bits, a fourth example, i.e. a subset comprised of just 0 and 2, can also be encoded with 4 bits. So it can be appreciated that the entropy encoding tends to achieve a greater level of compression (i.e. a lower compression ratio) when there are more zeros in the spatially decorrelated presence indications that are being entropy encoded.

Each of the size indications in this example indicates a value of zero, one-formed of 0 or 1s, one—formed of 0s and 2, or two. So each size indication can have 2 bits. In the example described above, in which a 16×16 block of spatially decorrelated presence indications is encoded using 2×2 subsets, then there are 64 subsets. Therefore, the size indications 902 will use 128 bits in the entropy encoded data 900. The size of the encoded data values field 904 is variable.

The example entropy encoding process described with reference to FIGS. 8 and 9 allows for fast decompression because, although the encoded data values have a variable length, the size indications have a fixed length so they can be used to identify where the data is for each of the encoded data values within the encoded data values field 904.

As another example, the entropy encoding module 322 could perform run length encoding to perform entropy encoding on the spatially decorrelated presence indications to determine entropy encoded data. Run length encoding is a known entropy encoding process. The run length encoding may be performed according to any order, e.g. a raster scan order or a Morton order. Run length encoding may achieve a good (i.e. low) compression ratio, but performing fast decompression may be difficult because it would be difficult to decode individual encoded values without decoding all of the preceding encoded values.

When the compression unit 316 has compressed the block of sub-primitive presence indications into a block of compressed data, the size of the block of compressed data may be compared with a threshold size, which corresponds to a budget (i.e. a maximum acceptable size) for the block of compressed data. If the size of the block of compressed data is less than or equal to the threshold size then the compression acceptable. However, if the size of the block of compressed data is greater than the threshold size then the source (i.e. the block of sub-primitive presence indications) can be filtered and then the filtered block of sub-presence indications can be compressed using the same method as described above. In this context, "filtered" means that a low pass filter has been applied to the input data, which in this sense would replace some fully present indications and/or fully absent indications with partially present indications. This can be done until the size of the block of compressed data is not greater than the threshold size. Looking at the compression process in FIGS. 7a to 7g, the compression process can be stopped in the step denoted by FIG. 7d, provided that the size of the resulting data is less than the appointed budget. If not, the process proceeds as planned and the data size is evaluated again in the step denoted by FIG. 7g.

Figure 10:
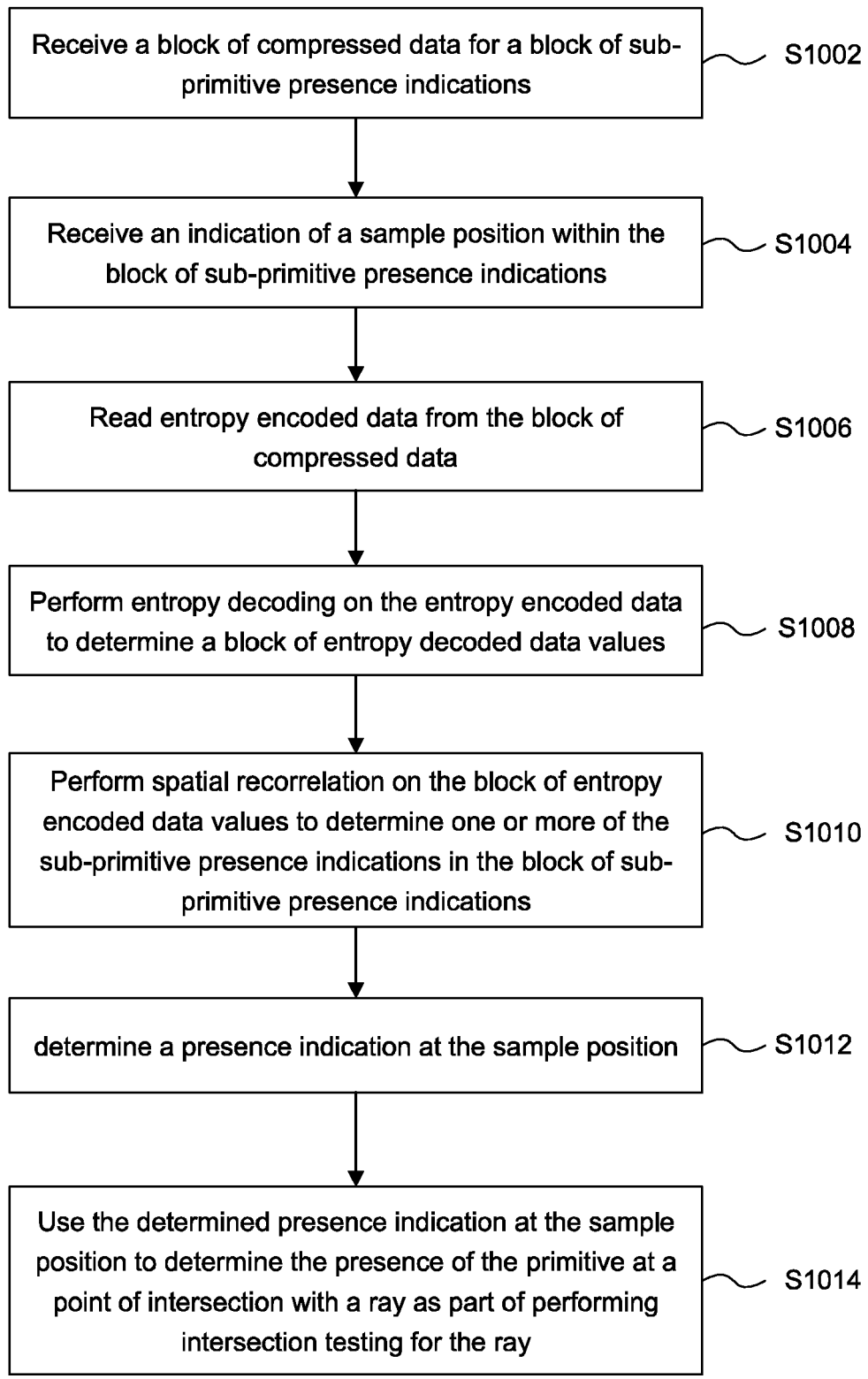
FIG. 10 is a flow chart for a method of decompressing compressed data to determine sub-primitive presence indications for use in intersection testing.

A method, performed by the decompression unit 318, of decompressing compressed data to determine one or more sub-primitive presence indications for use in intersection testing in a ray tracing system is described at a high level with reference to the flow chart in FIG. 10. The decompression process described with reference to FIG. 10 is simple to implement, so the latency and power consumption of the decompression unit 318 is low, and if the decompression unit is implemented in hardware then the silicon area is low.

In step S1002 the decompression unit receives a block of compressed data for a block of sub-primitive presence indications.

In step S1004 the decompression unit 318 receives an indication of a sample position within the block of sub-primitive presence indications for which a presence indication is to be determined. The sample position indication may comprise two coordinates (x,y) to indicate a position within the block of sub-primitive presence indications.

In step S1006 the entropy decoding module 324 of the decompression unit 318 reads entropy encoded data from the block of compressed data. In step S1008 the entropy decoding module 324 of the decompression unit 318 performs entropy decoding on the entropy encoded data to determine a block of entropy decoded data values. The entropy decoding module 324 is configured to perform an entropy decoding process that is complementary to the entropy encoding process that was performed to encode the data (e.g. by the entropy encoding module 322 as described above).

In step S1010 the spatial recorrelation module 326 of the decompression unit 318 performs spatial recorrelation on the block of entropy decoded values to determine one or more (e.g. all) of the sub-primitive presence indications in the block of sub-primitive presence indications. The output of the spatial recorrelation module 326, i.e. the spatially recorrelated block of entropy decoded values, represents one or more (e.g. all) of the sub-primitive presence indications in the block of sub-primitive presence indications.

In step S1012 the decompression unit 318 determines a presence indication for the sample position (for which an indication was received in step S1004) using one or more of the determined sub-primitive presence indications in the block of sub-primitive presence indications.

In step S1014 the decompression unit 318 outputs the determined presence indication at the sample position. The determined presence indication at the sample position can be used to determine the presence of a primitive at a point of intersection with a ray as part of performing intersection testing for the ray in the ray tracing system.

Figure 11:
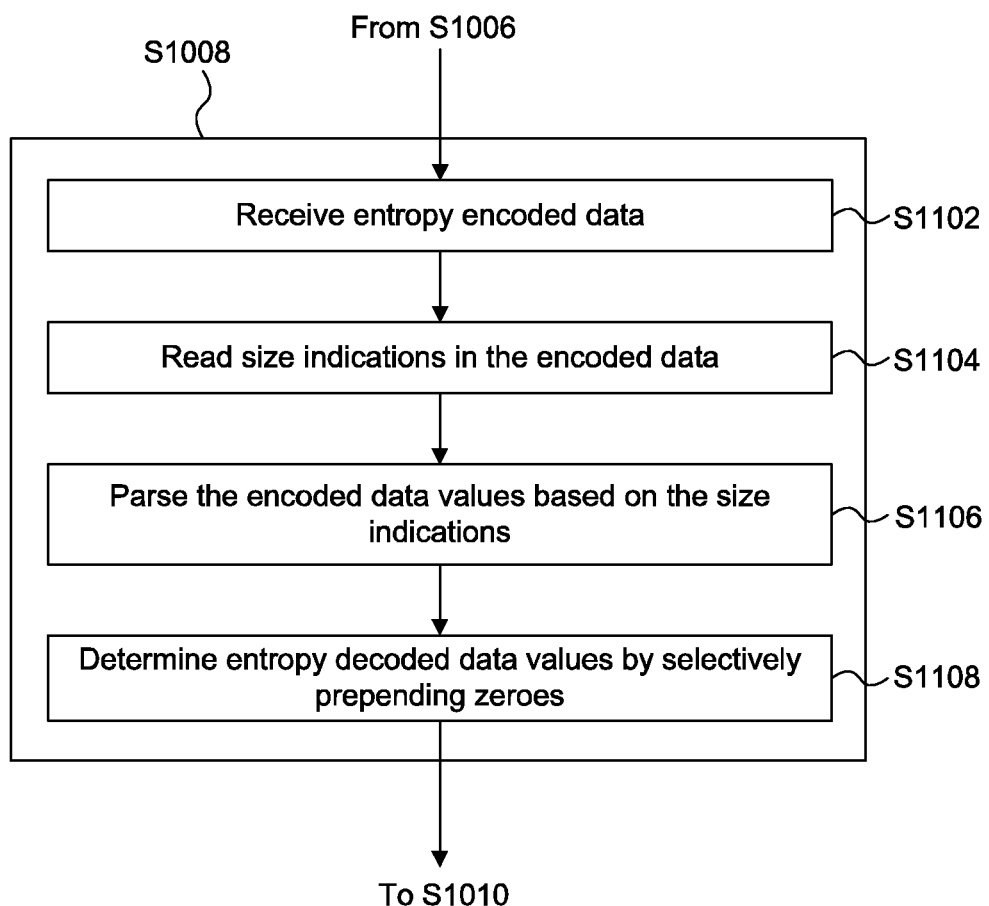
FIG. 11 is a flow chart illustrating an example process for performing entropy decoding on entropy encoded data to determine a block of entropy decoded data values.

The entropy decoding performed by the entropy decoding module 324 may be different in different examples. FIG. 11 is a flow chart illustrating a first example process for performing entropy decoding on entropy encoded data 900 in step S1008 to determine a block of entropy decoded data values. This example entropy decoding process decodes data that has been encoded as described above with reference to FIGS. 8 and 9. In particular, FIG. 9 shows a block of entropy encoded data 900 which includes size indications 902 and encoded data values 904 that can be decoded by the entropy decoding module 324 in step S1008. In particular, there are subsets of encoded data values that correspond to subsets of presence indications. Each of the subsets may, for example, be a 2×2 subset of encoded data values. In other examples, the subsets may be different sizes and/or shapes, e.g. they may be 4×4 or 2×4 subsets of encoded data values. For each subset, a size indication is stored in the size indications field 902 and encoded data values are stored in the encoded data values field 904 for each of the encoded data values in the subset. Each of the size indications may have 2 bits. Each of the encoded data values in a subset has a number of bits indicated by the size indication for that subset.

In step S1102 the entropy encoded data 900 is received at the entropy decoding module 324.

In step S1104 the entropy decoding module 324 reads, from the size indications field 902 of the entropy encoded data 900, for each subset of encoded data values, an indication (i.e. the size indication) that identifies a number of bits that is used for each of the encoded data values in the subset. In step S1104 each of the size indications for the different subsets may be read in parallel. This is possible because the size indications have a fixed bit-length (e.g. 2 bits each) and the size indications are stored in a separate field (the size indications field 902) to the variable-length encoded data values.

In step S1106 the entropy decoding module 324 parses the encoded data values in the encoded data values field 904 of the entropy encoded data 900 based on the identified numbers of bits (i.e. based on the size indications) to thereby interpret the encoded data values.

In step S1108 the entropy decoding module 324 determines the entropy decoded data values by selectively prepending leading zeroes to the interpreted encoded data values so that each of the entropy decoded data values has the same number of bits (e.g. 2 bits) as each of the presence indications in the block of sub-primitive presence indications. The entropy decoded data values can then be output from the entropy decoding module 324 and passed to the spatial recorrelation module 326 (i.e. after step S1108 the method can pass to step S1010).

The example entropy decoding process described with reference to FIG. 11 allows for fast decompression because, although the encoded data values have a variable length, the size indications have a fixed length so they can be used to identify where the data is for each of the encoded data values within the encoded data values field 904. This allows each of the encoded data values to be read in parallel.

As another example, the entropy decoding module 324 could perform Huffman decoding to perform entropy decoding on the entropy encoded data to determine a block of entropy decoded data values. This would be done if a Huffman encoding process was used to perform the entropy encoding process which produced the entropy encoded data. Huffman decoding is a known entropy decoding process. Huffman decoding may be used to decompress groups of entropy encoded data values rather than individual entropy encoded data values.

As another example, the entropy decoding module 324 could perform run length decoding to perform entropy decoding on the entropy encoded data to determine a block of entropy decoded data values. This would be done if a run length encoding process was used to perform the entropy encoding process which produced the entropy encoded data. Run length decoding is a known entropy decoding process. The run length decoding may be performed according to any order, e.g. a raster scan order or a Morton order, so long as it matches the order in which the run length encoding was performed. With run length decoding it may be difficult to decode individual encoded values without decoding all of the preceding encoded values.

Figure 12:
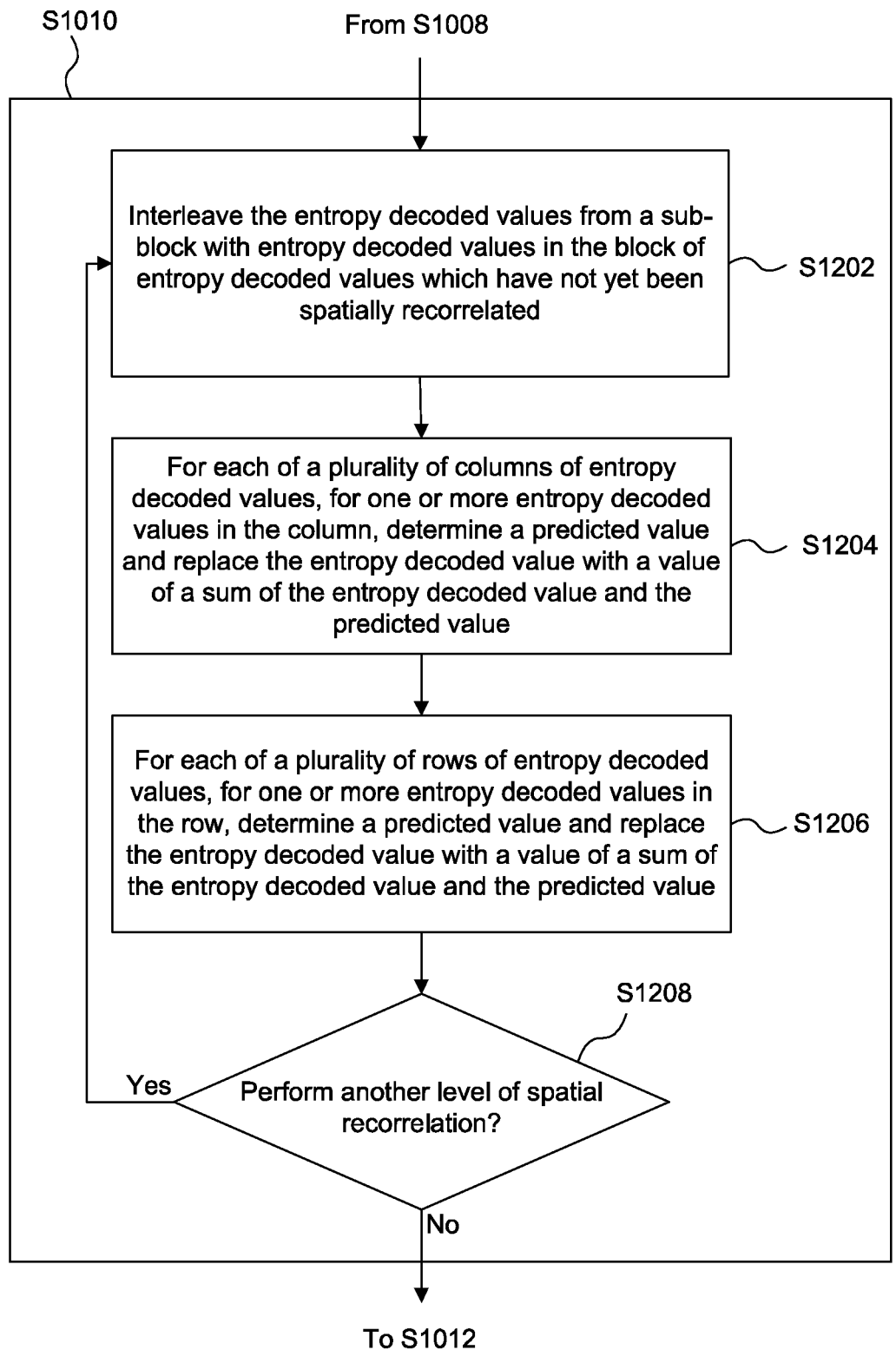
FIG. 12 is a flow chart illustrating an example process for performing spatial recorrelation on a block of entropy decoded values.

FIG. 12 is a flow chart illustrating an example process performed by the spatial recorrelation module 326 for performing spatial recorrelation on a block of entropy decoded values. The spatial recorrelation module 326 receives a block of entropy decoded values. As an example, the block of entropy decoded values may have the values shown in FIG. 7g. The spatial recorrelation process performs the reverse of the spatial decorrelation process that was performed during compression.

In step S1202 the spatial recorrelation module 326 interleaves entropy decoded values from the second level sub-block 718 with entropy decoded values in the block of entropy decoded values which have not yet been spatially recorrelated. If the input to step S1202 is a block of entropy decoded values 716 with values as shown in FIG. 7g, then the output of step S1202 is a block of entropy decoded values 714 with values as shown in FIG. 7f. As described above, the sub-block 710 is in the top left quadrant of the block 714.

In step S1204, for each of a plurality of columns (e.g. for all of the columns within the sub-block 710) of entropy decoded values, for one or more of the entropy decoded values in the column (e.g. for alternate entropy decoded values in the column within the sub-block 710) the spatial recorrelation module 326: (i) determines a predicted value for the entropy decoded value based on one or more other entropy decoded values in the column (e.g. based on adjacent (or neighbouring) entropy decoded values in the column within the sub-block 710), and (ii) replaces the entropy decoded value with a value of a sum of the entropy decoded value and the determined predicted value for the entropy decoded value. The result of step S1204 is a block of entropy decoded values 712 with values as shown in FIG. 7e.

In step S1206, for each of a plurality of rows (e.g. for all of the rows within the sub-block 710) of entropy decoded values, for one or more of the entropy decoded values in the row (e.g. for alternate entropy decoded values in the row within the sub-block 710) the spatial recorrelation module 326: (i) determines a predicted value for the entropy decoded value based on one or more other entropy decoded values in the row (e.g. based on adjacent (or neighbouring) entropy decoded values in the row within the sub-block 710), and (ii) replaces the entropy decoded value with a value of a sum of the entropy decoded value and the determined predicted value for the entropy decoded value. The result of step S1206 is a block of entropy decoded values 708 with values as shown in FIG. 7d. It can be seen in FIG. 7d that all of the entropy decoded values within the sub-block 710 have now been spatially recorrelated.

In the example shown in FIG. 12, the spatial recorrelation is performed for the columns of the block of entropy decoded values and then for the rows, but in other examples the spatial recorrelation could be performed for the rows of the block of entropy decoded values and then for the columns (i.e. steps S1204 and S1206 could be reordered).

In step S1208 the spatial recorrelation module 326 determines whether another level of spatial recorrelation is to be performed. If another level of spatial recorrelation is to be performed then the method passes from step S1208 back to step S1202 and the spatial recorrelation is performed at another level. In this example, spatial recorrelation is to be performed at one more level, i.e. at the level of the whole block, rather than on a sub-block, so the method passes back to step S1202.

In this iteration, in step S1202 the spatial recorrelation module 326 interleaves entropy decoded values from the sub-block 710 with entropy decoded values in the block of entropy decoded values which have not yet been spatially recorrelated. The interleaving may be performed in two stages, e.g. by interleaving rows and then by interleaving columns. If the input to step S1202 in this iteration is a block of entropy decoded values 708 with values as shown in FIG. 7d, then after the rows have been interleaved the block will be as shown in FIG. 7c. Then after the columns have been interleaved the block will be as shown in FIG. 7b. So the output of step S1202 in this iteration is a block of entropy decoded values 704 with values as shown in FIG. 7b.

In this iteration, in step S1204, for each of a plurality of columns (e.g. for all of the columns within the block 704) of entropy decoded values, for one or more of the entropy decoded values in the column (e.g. for alternate entropy decoded values in the column within the block 704) the spatial recorrelation module 326: (i) determines a predicted value for the entropy decoded value based on one or more other entropy decoded values in the column (e.g. based on adjacent (or neighbouring) entropy decoded values in the column within the block 704), and (ii) replaces the entropy decoded value with a value of a sum of the entropy decoded value and the determined predicted value for the entropy decoded value. The result of step S1204 in this iteration is a block of entropy decoded values 702 with values as shown in FIG. 7a.

In this iteration, in step S1206, for each of a plurality of rows (e.g. for all of the rows within the block 702) of entropy decoded values, for one or more of the entropy decoded values in the row (e.g. for alternate entropy decoded values in the row within the block 702) the spatial recorrelation module 326: (i) determines a predicted value for the entropy decoded value based on one or more other entropy decoded values in the row (e.g. based on adjacent (or neighbouring) entropy decoded values in the row within the block 702), and (ii) replaces the entropy decoded value with a value of a sum of the entropy decoded value and the determined predicted value for the entropy decoded value. The result of step S1206 in this iteration is a block of entropy decoded values 508 with values as shown in FIG. 5b. It can be seen in FIG. 5b that all of the entropy decoded values within the block 508 have now been spatially recorrelated.

In this iteration, in step S1208 the spatial recorrelation module 326 determines that there are no more levels of spatial recorrelation to be performed so the spatial recorrelation process (in step S1010) is finished and the method passes from step S1208 to step S1012. The block 508 represents the decompressed sub-primitive presence indications for the block of sub-primitive presence indications which can then be used in step S1012 to determine a presence indication at the sample position. In this example there are two levels of spatial recorrelation. In other examples there may be (only) one level of spatial recorrelation or more than two levels of spatial recorrelation, e.g. there may be three or four levels of spatial recorrelation.

As described above, in an example a presence indication representing a partially present presence state has a value of zero, a presence indication representing a fully present presence state has a value of one, and a presence indication representing a fully absent presence state has a value of two.

In each of steps S1204 and S1206, in which spatial recorrelation is performed for lines of entropy decoded values in either a first dimension or a second dimension, alternate entropy decoded values can each be replaced with a value of a sum of the entropy decoded value and a predicted value for the entropy decoded value by performing a summation calculation using a modulo-3 operation to determine the value of the sum of the entropy decoded value and the determined predicted value for the entropy decoded value. The use of the modulo-3 operation means that a value of 2 is congruent to a value of −1.

For example, a predicted value for an entropy decoded value based on two adjacent entropy decoded values in the same line can be performed using a Predict function which operates in accordance with:

$$\text{Predict}(L, R) = \begin{cases} L \text{ when } L = R \\ 0 \text{ otherwise} \end{cases},$$

and alternate entropy decoded values ($d_{2i+1}$) can be replaced with a value of a sum of the entropy decoded value ($d_{2i+1}$) and a predicted value for the entropy decoded value presence indication in accordance with:

$$d_{2i+1} := p_{2i+1} + \text{Predict}(d_{2i}, d_{2i+2}) \mod 3,$$

where $d_{2i}$ is the $(2i)^{th}$ entropy decoded value in the line, $d_{2i+1}$ is the $(2i+1)^{th}$ entropy decoded value in the line, and $d_{2i+2}$ is the $(2i+2)^{th}$ entropy decoded value in the line. i is an integer in the range from 0 to (N/2)−1 where N is the number of lines (e.g. rows or columns) in the block or sub-block for which spatial recorrelation is being performed. In this way, each 'odd' entropy decoded value in each line can be replaced with a linear prediction of its value based on the neighbouring (i.e. adjacent) 'even' entropy decoded values in the line.

If $d_{2i+1}$ is the final entropy decoded value in the line, such that $d_{2i+2}$ does not exist in the block of presence indications, then the value of $d_{2i}$ is used in place of $d_{2i+2}$ in the Predict function. For example, for entropy decoded values on the right boundary of the block of entropy decoded values step S1206 predicts the entropy decoded value based on just the adjacent entropy decoded value to the left of the entropy decoded value being predicted.

In the examples described herein the sub-primitives are squares, e.g. as shown in FIG. 5b, but in other examples they could be other shapes, e.g. triangles.

It is to be understood that the specific numbers in the examples described herein (e.g. the number of sub-primitive presence indications in a block of sub-primitive presence indications) are given by way of example, and in other implementations these numbers could be different.

Further, the examples provided herein use triangles and barycentric coordinates, but the schemes presented herein are also applicable to a surface that can be represented parametrically, e.g. tensor product patches such as bicubic patches, a sphere, or a (portion of) a surface of revolution or extrusion. The parameters can be used to index into the presence indications.

The main examples described herein have used the presence indications for the acceleration of ray tracing, but the method is also applicable to other rendering techniques, e.g. rasterisation. As mentioned in the background section above, GB patents 2538856 and 2522868 describe the use of an opacity state map to accelerate the processing of punch through primitives in a rasterisation system. In particular, the opacity state map is used to indicate whether blocks of texels of a texture are fully opaque, fully transparent, partially transparent or a mixture of these states. The indications in the opacity state map can be used to accelerate the processing of punch through polygons in a rasterization system. Similar to the presence indications described above with reference to a ray tracing system, each of the opacity states in the rasterization system of GB2538856B and GB2522868B is represented with two bits. The methods of compression/decompression of the presence indications described herein can also be applied to compress/decompress the indications of the opacity states in a rasterization system such as that described in GB2538856B and GB2522868B. The 'partially transparent' state and the 'mixture' state can be combined into a single state so that there are just three states, which can then be compressed/decompressed in the same way as for the fully present, partially present and fully absent presence states in the ray tracing systems described above.

Figure 13:
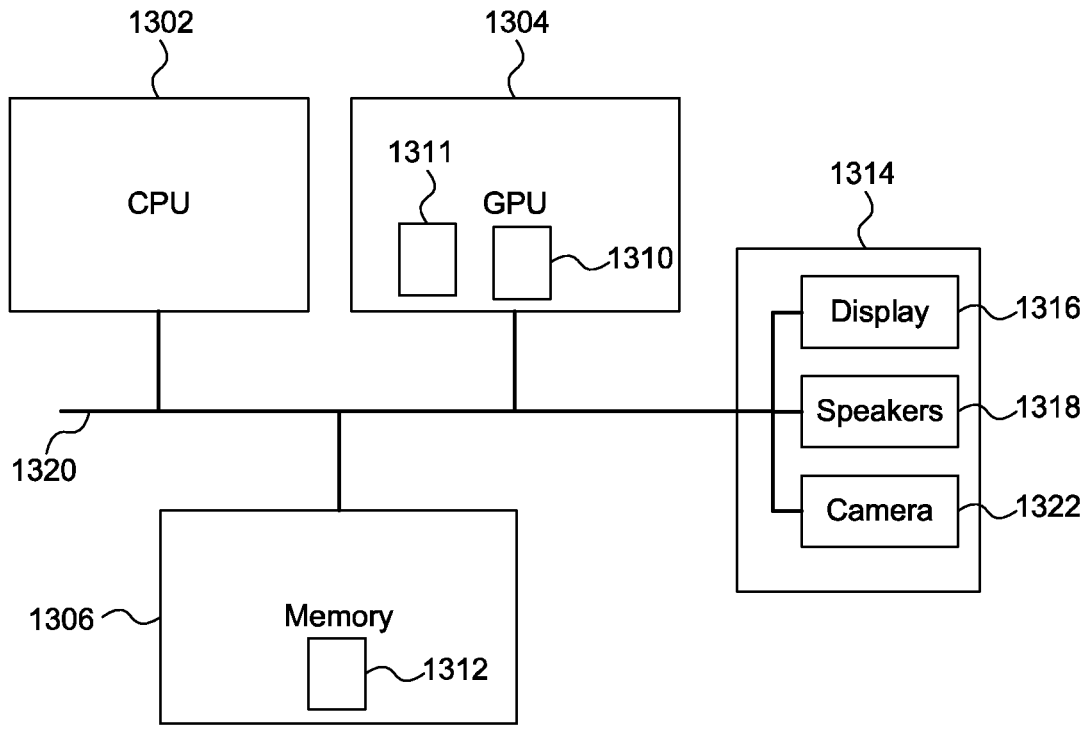
FIG. 13 shows a computer system in which a compression unit and/or a decompression unit is implemented.

FIG. 13 shows a computer system in which the compression and decompression units described herein may be implemented. The computer system comprises a CPU 1302, a GPU 1304, a memory 1306 and other devices 1314, such as a display 1316, speakers 1318 and a camera 1322. A processing block 1310 (corresponding to the ray tracing unit 302) is implemented on the GPU 1304, as well as a Neural Network Accelerator (NNA) 1311. In other examples, the processing block 1310 may be implemented on the CPU 1302 or within the NNA 1311. The components of the computer system can communicate with each other via a communications bus 1320. A store 1312 (corresponding to memory 304) is implemented as part of the memory 1306.

While FIG. 13 illustrates one implementation of a graphics processing system, it will be understood that a similar block diagram could be drawn for an artificial intelligence accelerator system—for example, by replacing either the CPU 1302 or the GPU 1304 with a Neural Network Accelerator (NNA) 1311, or by adding the NNA as a separate unit. In such cases, again, the processing block 1310 can be implemented in the NNA.

The ray tracing unit of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a compression and/or decompression unit need not be physically generated by the compression and/or decompression unit at any point and may merely represent logical values which conveniently describe the processing performed by the compression and/or decompression unit between its input and output.

The compression and/or decompression units described herein may be embodied in hardware on an integrated circuit. The compression and/or decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression and/or decompression unit configured to perform any of the methods described herein, or to manufacture a compression and/or decompression unit comprising any apparatus described herein. An integrated circuit definition dataset may be, for example, an integrated circuit description.

Therefore, there may be provided a method of manufacturing, at an integrated circuit manufacturing system, a compression and/or decompression unit as described herein. Furthermore, there may be provided an integrated circuit definition dataset that, when processed in an integrated circuit manufacturing system, causes the method of manufacturing a compression and/or decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression and/or decompression unit will now be described with respect to FIG. 14.

Figure 14:
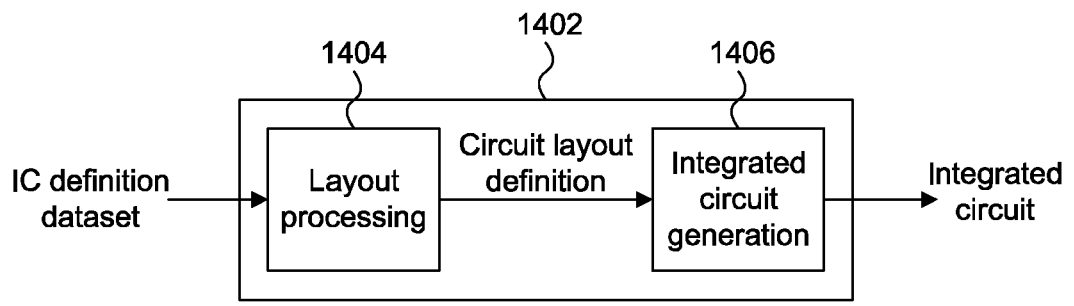
FIG. 14 shows an integrated circuit manufacturing system for generating an integrated circuit embodying a compression unit or a decompression unit.

FIG. 14 shows an example of an integrated circuit (IC) manufacturing system 1402 which is configured to manufacture a compression and/or decompression unit as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining a compression and/or decompression unit as described in any of the examples herein), process the IC definition dataset, and generate an IC according to the IC definition dataset (e.g. which embodies a compression and/or decompression unit as described in any of the examples herein). The processing of the IC definition dataset configures the IC manufacturing system 1402 to manufacture an integrated circuit embodying a compression and/or decompression unit as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression and/or decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of decompressing compressed data to determine one or more sub-primitive presence indications for use in a rendering system, the method comprising:
receiving a block of compressed data for a block of sub-primitive presence indications;
reading entropy encoded data from the block of compressed data;
performing entropy decoding on the entropy encoded data to determine a block of entropy decoded data values; and
performing spatial recorrelation on the block of entropy decoded values to determine one or more of the sub-primitive presence indications in the block of sub-primitive presence indications, said performing spatial recorrelation comprising:

(a) for each of a plurality of lines of entropy decoded values in a first dimension within the block of entropy decoded values:
for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value, and (b) for each of a plurality of lines of entropy decoded values in a second dimension within the block of entropy decoded values:
for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value.

2. The method of claim 1, wherein said one or more entropy decoded values in a line in the first dimension for which predicted values are determined are alternate entropy decoded values in that line in the first dimension, and wherein said one or more entropy decoded values in a line in the second dimension for which predicted values are determined are alternate entropy decoded values in that line in the second dimension.

3. The method of claim 1, wherein said one or more other entropy decoded values in the line on which the determination of a predicted value is based are adjacent to the entropy decoded value for which the predicted value is determined.

4. The method of claim 1, wherein said plurality of lines of entropy decoded values in a first dimension comprises all of the lines of entropy decoded values in the first dimension within the block of entropy decoded values, and wherein said plurality of lines of entropy decoded values in a second dimension comprises all of the lines of entropy decoded values in the second dimension within the block of entropy decoded values.

5. The method of claim 1, wherein each of the presence indications indicates a presence state which is one of: (i) fully present, (ii) fully absent, and (iii) partially present.

6. The method of claim 5, wherein a partially present presence state is represented by a value of zero in the block of sub-primitive presence indications.

7. The method of claim 5, wherein either:
a fully present presence state is represented by a value of one and a fully absent presence state is represented by a value of two in the block of sub-primitive presence indications; or
a fully present presence state is represented by a value of two and a fully absent presence state is represented by a value of one in the block of sub-primitive presence indications.

8. The method of claim 1, wherein said replacing the entropy decoded value with a value of a sum of the entropy decoded value and the determined predicted value for the entropy decoded value comprises performing a summation calculation using a modulo-3 operation to determine the value of the sum of the entropy decoded value and the determined predicted value for the entropy decoded value.

9. The method of claim 1, wherein said determining a predicted value for the entropy decoded value based on one or more other entropy decoded values in the line is performed using a Predict function which operates in accordance with:

$$\text{Predict}(L, R) = \begin{cases} L & \text{when } L = R \\ 0 & \text{otherwise} \end{cases}$$

and wherein said replacing the entropy decoded value with a value of a sum of the entropy decoded value and the determined predicted value for the entropy decoded value is performed in accordance with:

$$d_{2i+1} := p_{2i+1} + \text{Predict}(d_{2i}, d_{2i+2}) \bmod 3,$$

wherein L is a first other entropy decoded value in the line, R is a second other entropy decoded value in the line, $d_{2i}$ is the $(2i)^{th}$ entropy decoded value in the line, $d_{2i+1}$ is the $(2i+1)^{th}$ entropy decoded value in the line, and $d_{2i+2}$ is the $(2i+2)^{th}$ entropy decoded value in the line, and i is an integer.

10. The method of claim 9, wherein if $d_{2i+1}$ is the final entropy decoded value in the line, such that data does not exist in the block of entropy decoded values, then the value of $d_{2i}$ is used in place of $d_{2i+2}$ in the Predict function.

11. The method of claim 1, wherein either:
the lines of entropy decoded values in the first dimension within the block of entropy decoded values are rows of entropy decoded values within the block of entropy decoded values, and the lines of entropy decoded values in the second dimension within the block of entropy decoded values are columns of entropy decoded values within the block of entropy decoded values; or
the lines of entropy decoded values in the first dimension within the block of entropy decoded values are columns of entropy decoded values within the block of entropy decoded values, and the lines of entropy decoded values in the second dimension within the block of entropy decoded values are rows of entropy decoded values within the block of entropy decoded values.

12. The method of claim 1, wherein said performing spatial recorrelation further comprises, prior to (a) and (b):
(c) for each of a plurality of lines of entropy decoded values in the first dimension within a sub-block of entropy decoded values within the block of entropy decoded values:
for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and
(d) for each of a plurality of lines of entropy decoded values in the second dimension within the sub-block of entropy decoded values:
for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and
(e) interleaving the entropy decoded values from the sub-block with entropy decoded values in the block of entropy decoded values which have not yet been spatially recorrelated.

13. The method of claim 1, wherein said performing entropy decoding on the entropy encoded data to determine a block of entropy decoded data values comprises:
reading, from the entropy encoded data, for each subset of a plurality of subsets of encoded data values, an indication that identifies a number of bits that is used for each of the encoded data values in the subset; and parsing the encoded data values in the entropy encoded data based on the identified numbers of bits to thereby interpret the encoded data values.

14. The method of claim 13, wherein each of the subsets of encoded data values is a 2×2 subset of encoded data values.

15. The method of claim 1, wherein said performing entropy decoding on the entropy encoded data to determine a block of entropy decoded data values comprises performing Huffman decoding or run length decoding.

16. The method of claim 1, further comprising:

receiving an indication of a sample position within the block of sub-primitive presence indications for which a presence indication is to be determined; and determining a presence indication for the sample position using one or more of the determined sub-primitive presence indications in the block of sub-primitive presence indications.

17. The method of claim 16, wherein the rendering system is a ray tracing system and wherein the method further comprises using the determined presence indication at the sample position to determine the presence of a primitive at a point of intersection with a ray as part of performing intersection testing for the ray in the ray tracing system.

18. The method of claim 1, wherein the rendering system is a ray tracing system or a rasterization system.

19. A decompression unit configured to decompress compressed data to determine one or more sub-primitive presence indications for use in a rendering system, the decompression unit being configured to receive a block of compressed data for a block of sub-primitive presence indications, the decompression unit comprising:

an entropy decoding module configured to perform entropy decoding on entropy encoded data that has been read from the block of compressed data to determine a block of entropy decoded data values; and a spatial recorrelation module configured to perform spatial recorrelation on the block of entropy decoded values to determine one or more of the sub-primitive presence indications in the block of sub-primitive presence indications, said performing spatial recorrelation comprising:

(a) for each of a plurality of lines of entropy decoded values in a first dimension within the block of entropy decoded values:

for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value, and (b) for each of a plurality of lines of entropy decoded values in a second dimension within the block of entropy decoded values:

for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value.

20. A non-transitory computer readable storage medium having stored thereon a computer readable dataset description of an integrated circuit that, when processed in an integrated circuit manufacturing system, configures the integrated circuit manufacturing system to manufacture a decompression unit configured to decompress compressed data to determine one or more sub-primitive presence indications for use in a rendering system, the decompression unit being configured to:

receive a block of compressed data for a block of sub-primitive presence indications;

read entropy encoded data from the block of compressed data;

perform entropy decoding on the entropy encoded data to determine a block of entropy decoded data values; and perform spatial recorrelation on the block of entropy decoded values to determine one or more of the sub-primitive presence indications in the block of sub-primitive presence indications, said performing spatial recorrelation comprising:

(a) for each of a plurality of lines of entropy decoded values in a first dimension within the block of entropy decoded values:

for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value; and (b) for each of a plurality of lines of entropy decoded values in a second dimension within the block of entropy decoded values:

for one or more of the entropy decoded values in the line: (i) determining a predicted value for the entropy decoded value based on one or more other entropy decoded values in the line, and (ii) replacing the entropy decoded value with a value of a sum of the entropy decoded value and the determined predicted value for the entropy decoded value.

* * * * *